(12) United States Patent
Iwasa

(10) Patent No.: US 11,715,969 B2
(45) Date of Patent: Aug. 1, 2023

(54) CO-CHARGING SYSTEM BY A SOLAR PANEL AND (AC ADAPTOR OR MOBILE BATTERY)

(71) Applicant: Hiroshi Iwasa, Nishi-Tokyo (JP)

(72) Inventor: Hiroshi Iwasa, Nishi-Tokyo (JP)

( * ) Notice: Subject to any disclaimer, the term of this patent is extended or adjusted under 35 U.S.C. 154(b) by 0 days.

(21) Appl. No.: 17/300,818

(22) Filed: Nov. 17, 2021

(65) Prior Publication Data
US 2022/0255341 A1    Aug. 11, 2022

(30) Foreign Application Priority Data
Nov. 27, 2020   (JP) ................................ 2020-196435

(51) Int. Cl.
*H02J 7/35*   (2006.01)
*H02M 3/156*  (2006.01)
*H02M 7/537*  (2006.01)

(52) U.S. Cl.
CPC .............. *H02J 7/35* (2013.01); *H02M 3/156* (2013.01); *H02M 7/537* (2013.01); *H02J 2207/20* (2020.01)

(58) Field of Classification Search
CPC ........ H02J 7/35; H02J 2207/20; H02M 3/156; H02M 7/537
See application file for complete search history.

(56) References Cited

U.S. PATENT DOCUMENTS

2012/0181990 A1\* 7/2012 Asakura ................... H02J 5/00
320/137

\* cited by examiner

*Primary Examiner* — Robert L Deberadinis

(57) ABSTRACT

By using the co-charging system of this invention, a 12V battery such as a lead storage battery is not required, so that depreciation cost can be suppressed. In order to realize above, power should be always supplied to the power supply node of the control circuit by following. (1) Connect the diode so that current flows from the power supply supplied from the solar cell, the power supply supplied from the AC adapter, the power supply supplied from the mobile battery, to the power supply node of the control circuit. (2) Connect a large-capacity capacitor such as an electric double layer capacitor to the power supply of the control circuit. (3) The inverter has an nMOS field-effect transistor+resistor configuration, and the inverter has an nMOS field-effect transistor+resistor+pMOS field-effect transistor configuration.

5 Claims, 11 Drawing Sheets

Fig.2
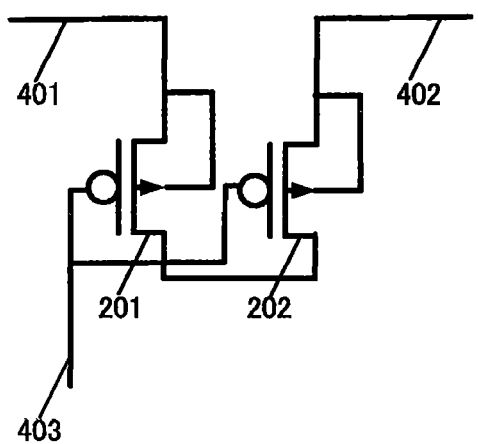
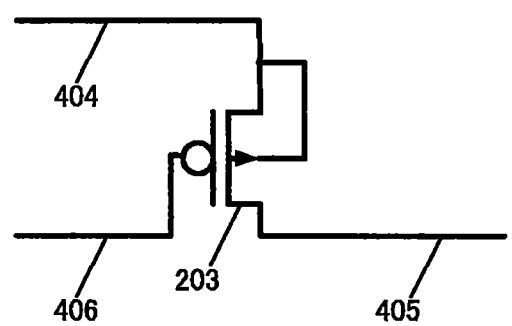
(a) Analog switching element by 2 FETs
(b) Analog switching element by single FET Fig.3
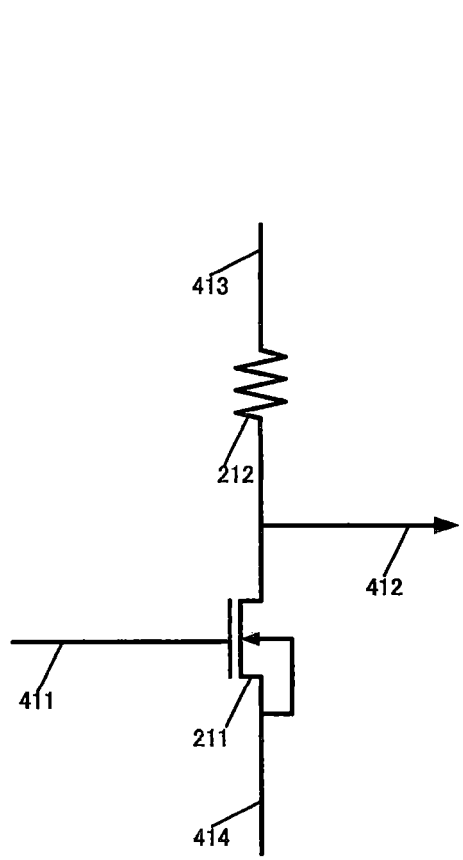
(a) An inverter by nMOS + resister
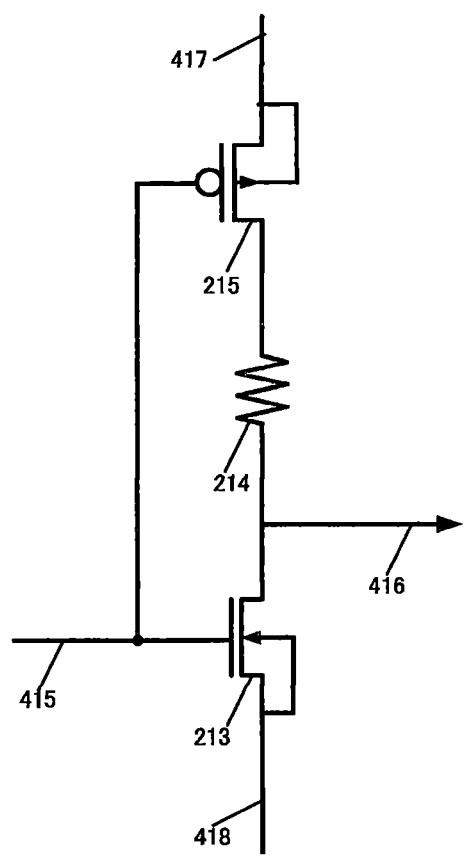
(b) An inverter by nMOS + resister + pMOS Fig.7
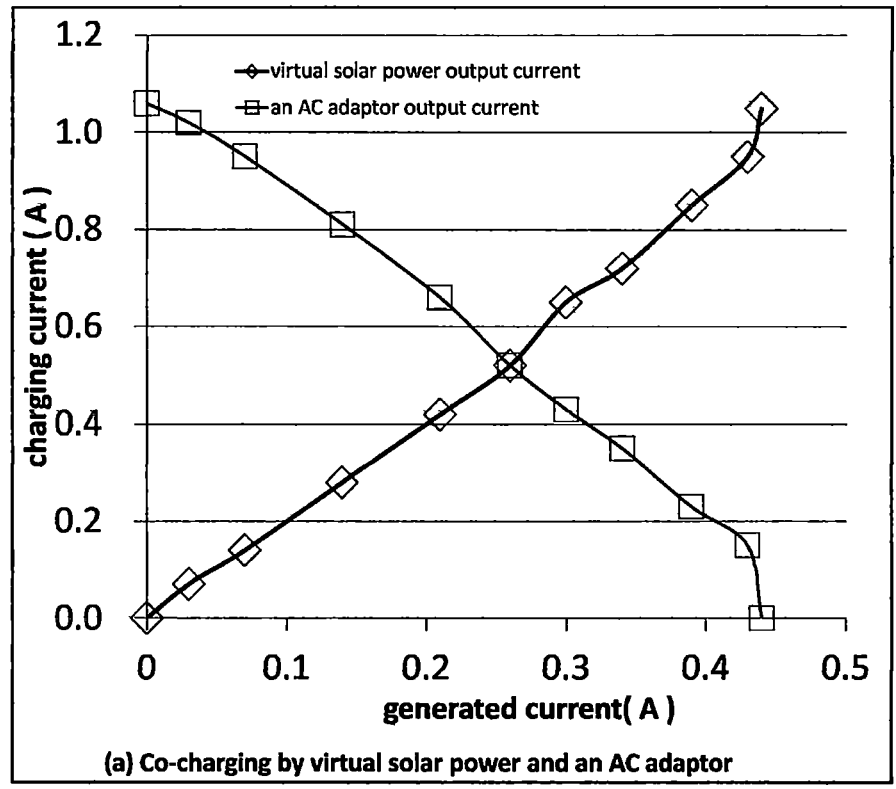
(a) Co-charging by virtual solar power and an AC adaptor
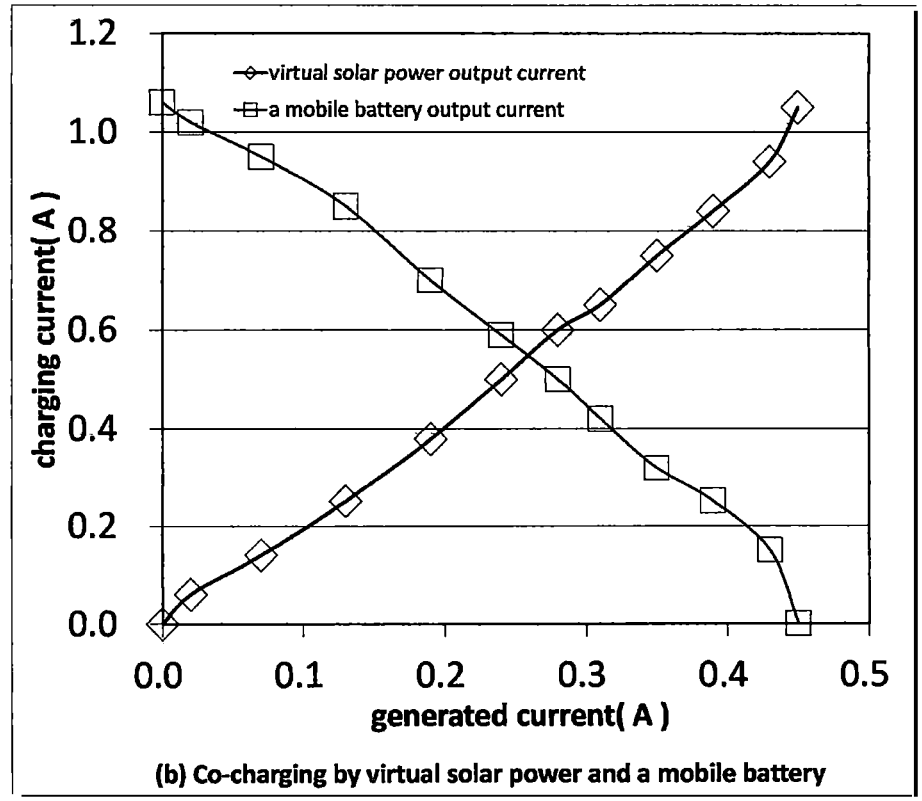
(b) Co-charging by virtual solar power and a mobile battery

Fig.9

| | the case power is supplied | the case power is not supplied |
|---|---|---|
| solar panel | daytime | nighttime |
| AC adaptor | normal time indoor | when disaster occured, when you bring this system outdoor |
| mobile battery | Energy remains in the mobile battery and not disconnected by mobile battery | the mobile battery is empty, or disconnected by mobile battery |

(a) The condition if power is supplied from each device

| type name | the first inverter | the second inverter |
|---|---|---|
| CMOS type | nMOS + pMOS | nMOS + pMOS |
| nMOS type | nMOS + resistor | nMOS + resistor |
| this invention type | nMOS + resistor | nMOS + resistor + pMOS |

(b) Circuit composition of the control circuit for each type

| | night model | co-charging mode | fine weather mode | stand-alone mode |
|---|---|---|---|---|
| potential of node311 | low | middle | high | middle |
| CMOS type | small | large | small | large |
| nMOS type | middle | middle | middle | middle |
| this invention type | small | middle | middle | middle |

(c) Power consumption of the control circuit by each composition (a)          (b)

CO-CHARGING SYSTEM BY A SOLAR PANEL AND (AC ADAPTOR OR MOBILE BATTERY)

STATEMENT REGARDING FEDERALLY SPONSORED RESEARCH OR DEVELOPMENT

The inventor is not sponsored by federal government.

CROSS-REFERENCE TO RELATED APPLICATION

The present application claims the benefit application number 2020-196435, filed in Japan on Nov. 27, 2020, the subject matter of which is hereby incorporated herein by reference.

Reference to a "Sequence Listing," a Table, or a Computer Program Listing Appendix Submitted on a Compact Disc and an Incorporation-by-Reference of the Material on the Compact Disc

N/A

BACKGROUND OF THE INVENTION

This invention relates to a system for cooperatively charging a target device by electric power from a plurality of electric power sources such as a solar cell and an AC adapter, or a solar cell and a mobile battery.

In recent years, photovoltaic power generation has been attracting attention. The photovoltaic power generation system includes an independent power supply system and a grid linkage system. The former stores electricity generated by a solar cell panel or a solar cell module in a storage battery and uses it as it is or after converting it into 100V AC when necessary. On the other hand, in the grid linkage system, after converting to 100V AC, if the amount of power generation is less than the consumed power, the power is purchased from the power company's grid, and if the power generation is more than the consumed power, the power company's grid is used and electricity is sold. The independent power supply system shall also include a system that switches to supply power from the power company's grid after a momentary power outage when the power stored in the storage battery becomes low.

For small-scale photovoltaic power generation systems, an independent power supply system is more suitable than a grid linkage system. However, the storage battery used in a normal independent power supply system is a consumable item, and can be used for only about 3 years in a short case under normal usage.

Here, let us consider the cost feeling of the independent power supply system. As an example, solar cell (160 W) 20,000 yen, lead storage battery (33Ah) 10,000 yen, charge controller 5,000 yen, commercial power switch 5,000 yen, AC inverter 5,000 yen, USB charger 1,000 yen. In this case, the total cost is 46,000 yen. However, in the short case, the lead-acid battery lasts only about 3 years. Therefore, the cost for 12 years will be 76,000 yen. That is, in the case of this example, it can be seen that the cost is about four times that of the solar cell.

Therefore, Patent Document 1 shows a method of using an input from a commercial power source in combination with an input from a solar cell.

PRIOR ART DOCUMENT

Patent Document

[Patent Document 1] Japanese Patent Application Laid-Open No. 2013-90560

SUMMARY OF INVENTION

Problems to be Solved by the Invention

However, Patent Document 1 is only a conceptual discussion and does not show a specific circuit and control method.

In view of the above, it is an object of this invention to provide a charging system with reduced cost. Here, in order to reduce the cost, in particular, by not using a 12V lead-acid battery, it is an object to suppress the running cost, reduce the cost of the charging system, and reduce the weight.

BRIEF SUMMARY OF THE INVENTION

In order to solve this problem, in the charging system in this invention the circuit is comprised of a first inverter circuit, a second inverter circuit, a first rectifying diode, a second rectifying diode, a third rectifying diode, an first capacitor, a first current-carrying element, an first node, a second node, a third node, a fourth node, and a fifth node, and the first inverter circuit includes an n-channel electric field effect transistor and a resistor, and the second inverter circuit includes an n-channel electric field effect transistor, a resistor, and a resistor.

And in the charging system in this invention, the power supply node of the first inverter circuit is connected to the third node, and the power supply node of the second inverter circuit is connected to the third node and the anode of the first rectifying diode is connected to the fourth node, the cathode of the first rectifying diode is connected to the third node, and the anode of the second rectifying diode is connected to the first node, and the cathode of the second rectifying diode is connected to the third node, the anode of the third rectifying diode is connected to the second node, the cathode of the second rectifying diode is connected to the third node, and one end of the eleventh capacitor is connected to the third node, and the first elements that carry a current are connected between the third node and the fifth node, and the capacitance of the first capacitor is 0.1 F (farad) or more.

By using the co-charging system of this invention, a 12V battery such as a lead storage battery is not required, so that depreciation cost can be suppressed. In addition, the weight is reduced because there is no heavy lead-acid battery. Regarding the path of direct charging from the solar cell, a DC power supply is performed to charge the charging target without converting it to alternating current from the solar panel even once, and voltage conversion is performed only once, so there is no waste. And since it is featured with a stand-alone mode and has an analog switching element in the solar cell system to provide feedback, it is possible to efficiently charge the device to be charged even when power is supplied only from the solar cell. Then, when the solar cell is not generating power, there is an analog switching element connected in series between the solar cell and the device to be charged with the directions reversed from each other. Therefore, when there is only one solar cell, the power supply system does not require the reverse current protection diode. Therefore, there is no voltage drop due to the reverse current prevention diode, and the power efficiency is good. Further, due to various measures such as a diode, a large-capacity capacitor, and power saving, even if the mobile battery stops supplying power once, charging is started immediately depending on the mobile battery when the device to be charged is connected.

BRIEF DESCRIPTION OF THE SEVERAL VIEWS OF THE DRAWING

FIG. 2 is the content of the switch symbol in FIG. 1.

FIG. 3 is the content of the inverter symbol in FIG. 1.

FIG. 7 is an experimental result of the relationship between the generated current, and "the charging current from the solar panel, the AC adapter, or mobile battery" in the co-charging mode.

FIG. 9 shows the conditions under which power is supplied from each power source, the circuit configuration of the inverter to be compared, and the current consumption of the control portion in each circuit configuration.

DETAILED DESCRIPTION OF THE INVENTION

The first embodiment relates to a cooperative charging system.

Figure 1:
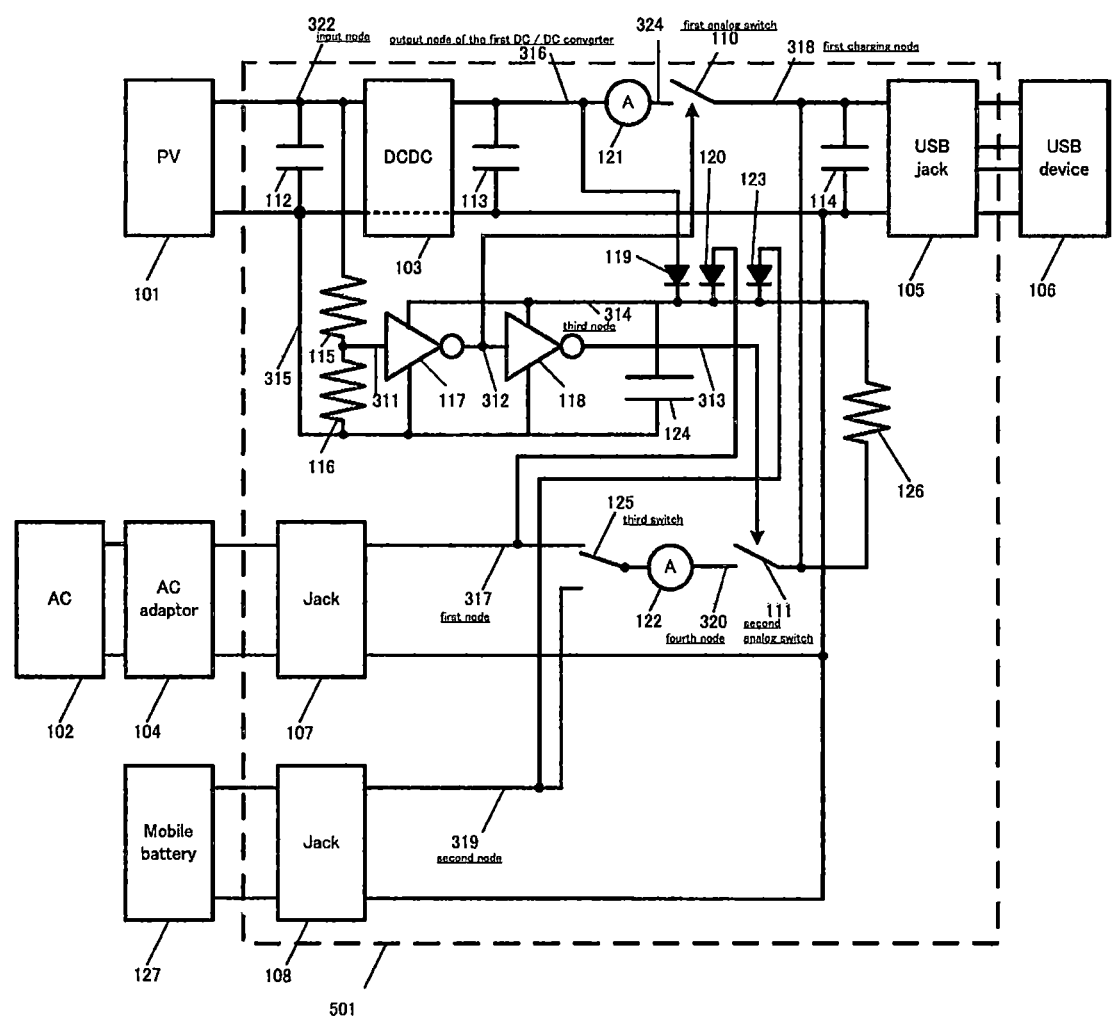
FIG. 1 is a co-charging system according to the first embodiment of this invention.

FIG. 1 shows a diagram of a cooperative charging system according to the first embodiment. The cooperative charging system includes a control circuit 501, a solar panel 101, a commercial AC power supply 102, an AC adapter 104, a mobile battery 127, and a USB device (charge target device) 106.

The control circuit 501 includes a DC/DC converter 103, a USB jack 105, analog switching elements 110, 111, capacitors 112, 113, 114, resistors 115, 116, inverters 117, 118, and rectifying diodes 119, 120, 123, current meters 121 and 122, a large-capacity capacitor 124, a mechanical switch 125, and a resistor 126.

The connection will be described with respect to the control circuit 501 and its peripheral parts. The positive terminal of the solar panel 101 is connected to the positive input terminal of the DC-DC converter 103, the positive terminal of the capacitor 112, and one end of the resistor 115. The negative terminal of the solar panel 101 is connected to the GND 315. Since there are many elements connected to the GND 315, it is described only that the elements/devices connected to the GND 315 are connected to the GND 315.

The positive terminal of the commercial AC power supply 102 is connected to the positive input terminal of the AC adapter 104. The negative terminal of the commercial AC power supply 102 is connected to the negative input terminal of the AC adapter 104.

The positive input terminal of the DC-DC converter 103 is connected to the positive terminal of the solar panel 101, the positive terminal of the capacitor 112, and one end of the resistor 115. The positive output terminal of the DC-DC converter 103 is connected to the positive terminal of the capacitor 113, the positive terminal of the ammeter 121, and the anode of the diode 119. The negative terminal of the DC-DC converter 103 is connected to the GND 315.

The positive input terminal of the AC adapter 104 is connected to the positive terminal of the commercial AC power supply 102. The negative input terminal of the AC adapter 104 is connected to the negative terminal of the commercial AC power supply 102. The positive output terminal of the AC adapter 104 is connected to the positive input terminal of the jack 107. The negative output terminal of the AC adapter 104 is connected to the negative input terminal of the jack 107.

The positive input terminal of the jack 107 is connected to the positive output terminal of the AC adapter 104. The negative input terminal of the jack 107 is connected to the negative output terminal of the AC adapter 104. The positive output terminal of the jack 107 is connected to the anode of the diode 120 at one end of the selection side of the mechanical switch 125. The negative output terminal of jack 107 is connected to GND315.

The positive terminal of the mobile battery 127 is connected to the positive input terminal of the jack 108. The negative terminal of the mobile battery 127 is connected to the negative input terminal of the jack 108.

The positive input terminal of the jack 108 is connected to the positive terminal of the mobile battery 127. The negative input terminal of the jack 108 is connected to the negative terminal of the mobile battery 127. The positive output terminal of the jack 108 is connected to the anode of the diode 123 at one end of the selection side of the mechanical switch 125. The negative output terminal of jack 108 is connected to GND315.

The positive input terminal and positive output terminal of jack 107 and the negative input terminal and negative output terminal of jack 107 were explained as separate nodes, but they are usually connected internally. Similarly, the positive input terminal and the positive output terminal of the jack 108 and the negative input terminal and the negative output terminal of the jack 108 have been described as separate nodes, but they are usually connected internally.

The positive input terminal of the USB jack 105 is connected to one end of the analog switching element 110, one end of the analog switching element 111 (output side), the positive terminal of the capacitor 114, and one end of the resistor 126. The negative input terminal of the USB jack 105 is connected to GND315. The power plus terminal of the USB jack 105 is connected to the power plus output terminal of the USB device 106. The power negative terminal of the USB jack 105 is connected to the power negative output terminal of the USB device 106. The signal plus terminal of the USB jack 105 is connected to the signal plus output terminal of the USB device 106. The negative signal terminal of the USB jack 105 is connected to the negative signal output terminal of the USB device 106.

The power plus terminal of the USB device 106 is connected to the power plus output terminal of the USB jack 105. The power negative terminal of the USB device 106 is connected to the power negative output terminal of the USB jack 105. The signal plus terminal of the USB device 106 is connected to the signal plus output terminal of the USB jack 105. The negative signal terminal of the USB device 106 is connected to the negative signal output terminal of the USB jack 105.

One end of the analog switching element 110 is connected to the negative terminal of the ammeter 121. The other end of the analog switching element 110 is connected to one end (output) of the analog switching element 111, the positive terminal of the capacitor 114, the positive input terminal of the USB jack 105, and one end of the resistor 126. The control terminal of the analog switching element 110 is connected to the output of the inverter 117 and the input of the inverter 118.

One end (input) of the analog switching element 111 is connected to the negative terminal of the ammeter 122. The other end (output) of the analog switching element 111 is connected to one end of the analog switching element 110, the positive terminal of the capacitor 114, the positive input terminal of the USB jack 105, and one end of the resistor 126. The control terminal of the analog switching element 111 is connected to the output of the inverter 118.

The positive terminal of the capacitor 112 is connected to the positive terminal of the solar panel 101, the positive input terminal of the DC-DC converter 103, and one end of the resistor 115. The negative terminal of the capacitor 112 is connected to GND315.

The positive terminal of the capacitor 113 is connected to the positive output terminal of the DC-DC converter 103, the positive terminal of the ammeter 121, and the anode of the diode 119. The negative terminal of the capacitor 113 is connected to GND315.

The positive terminal of the capacitor 114 is connected to one end of the analog switching element 110, one end (output) of the analog switching element 111, the positive input terminal of the USB jack 105, and one end of the resistor 126. The negative terminal of the capacitor 114 is connected to GND315.

One end of the resistor 115 is connected to the positive terminal of the solar panel 101, the positive input terminal of the DC-DC converter 103, and the positive terminal of the capacitor 112. The other end of the resistor 115 is connected to one end of the resistor 116, the input of the inverter 117.

One end of the resistor 116 is connected to one end of the resistor 115 and the input of the inverter 117. The other end of the resistor 116 is connected to GND315.

The input of the inverter 117 is connected to one end of the resistor 115 and one end of the resistor 116. The output of the inverter 117 is connected to the input of the inverter 118 and the control terminal of the analog switching element 110. The VDD terminal of the inverter 117 is connected to the cathode of the rectifying diode 119, the cathode of the rectifying diode 120, the cathode of the rectifying diode 123, the VDD terminal of the inverter 118, the positive terminal of the large capacity capacitor 124, and one end of the resistor 126. The VSS terminal of the inverter 117 is connected to the GND 315.

The input of the inverter 118 is connected to the output of the inverter 117 and the analog switching element 110 control terminal. The output of the inverter 118 is connected to the control terminal of the analog switching element 111. The VDD terminal of the inverter 118 is connected to the cathode of the rectifying diode 119, the cathode of the rectifying diode 120, the cathode of the rectifying diode 123, the VDD terminal of the inverter 117, the positive terminal of the large capacity capacitor 124, and one end of the resistor 126. The VSS terminal of the inverter 118 is connected to the GND 315.

The anode of the rectifier diode 119 is connected to the negative terminal of the ammeter 121, the positive output terminal of the DC-DC converter 103, and one end of the capacitor 113. The cathode of the rectifying diode 119 is connected to the cathode of the rectifying diode 120, the cathode of the rectifying diode 123, the VDD terminal of the inverter 117, the VDD terminal of the inverter 118, the positive terminal of the large capacity capacitor 124, and one end of the resistor 126.

The anode of the rectifying diode 120 is connected to one end of the selection side of the mechanical switch 125, the positive output terminal of the jack 107. The cathode of the rectifying diode 120 is connected to the cathode of the rectifying diode 119, the cathode of the rectifying diode 123, the VDD terminal of the inverter 117, the VDD end of the inverter 118, the positive terminal of the large capacity capacitor 124, and one end of the resistor 126.

The anode of the rectifying diode 123 is connected to the positive output terminal of the jack 108 at one end of the selection side of the mechanical switch 125. The cathode of the rectifying diode 123 is connected to the cathode of the rectifying diode 119, the cathode of the rectifying diode 120, the VDD terminal of the inverter 117, the VDD terminal of the inverter 118, the positive terminal of the large capacity capacitor 124, and one end of the resistor 126.

The positive terminal of the ammeter 121 is connected to the positive output terminal of the DC-DC converter 103, the positive terminal of the capacitor 113, and the anode of the diode 119. The negative terminal of the ammeter 121 is connected to one end of the analog switching element 110.

The positive terminal of the ammeter 122 is connected to one end of the mechanical switch 125 on the selective side. The negative terminal of the ammeter 122 is connected to one end (input) of the analog switching element 111.

The positive terminal of the large-capacity capacitor 124 is connected to the positive terminal of the inverter 117, the positive terminal of the inverter 118, the cathode of the diode 119, the cathode of the diode 120, the cathode of the diode 123, and one end of the resistor 126. The negative terminal of the large-capacity capacitor 124 is connected to GND315.

One of the selected terminals of the mechanical switch 125 is connected to the positive output terminal of the jack 107 and the anode of the diode 120. One of the other terminals on the selective side of the mechanical switch 125 is connected to the positive output terminal of the jack 108 and the anode of the diode 123. The common side of the mechanical switch 125 is connected to one end of the analog ammeter 122.

One end of the resistor 126 is connected to the VDD terminal of the inverter 117, the VDD terminal of the inverter 118, the cathode of the diode 119, the cathode of the diode 120, the cathode of the diode 123, and the positive terminal of the large capacity capacitor 124. The other end of the resistor 126 is connected to one end of the analog switching element 110, one end of the analog switching element 111, the positive input terminal of the USB jack 105, and the positive terminal of the capacitor 114.

The connection of the analog switching element 110 will be described. The node 324 in FIG. 1 is connected to the node 401 in FIG. 2 (*a*). The node 318 in FIG. 1 is connected to the node 402 in FIG. 2 (*a*). The node 312 in FIG. 1 is connected to the node 403 in FIG. 2 (*a*).

The connection of the analog switching element 111 will be described. The node 320 in FIG. 1 is connected to the node 404 in FIG. 2 (*b*). Node 318 in FIG. 1 is connected to node 405 in FIG. 2 (*b*). The node 313 in FIG. 1 is connected to the node 406 in FIG. 2 (*b*).

As shown in FIG. 2B, when one pMOS field effect transistor is used as an analog switching element, when the potential of the node 404 is higher than the potential of the node 405, the current flowing between the source node 404 and the drain node 405 can be controlled in an analog manner. The greater the voltage between the source node 404 and the gate node 406, the greater the current flowing between the source node 404 and the drain node 405. Such analog operation can be used to adjust the amount of current by feedback.

Here, as shown in FIG. 2B, when one pMOS field effect transistor is used as an analog switching element, on the other hand, when the potential of the node 405 is higher than the potential of the node 404, the current cannot be adjusted and limited and a large current flows regardless of the potential of the input gate 406.

As shown in FIG. 2A, if two pMOS field effect transistors connected in reverse and connected in series are used as an analog switching element, the current flowing between node 401 and node 402 can be controlled in an analog manner by the potential of the gate 403 regardless of which of the potentials of node 401 and node 402 is high. The greater the voltage between the source node "401 or 402" and the gate node 403, the greater the current flowing between node 401 and node 402. Such analog operation can be used to adjust the amount of current by feedback.

As shown in FIG. 2A, if two pMOS field effect transistors connected by reversing the sources are used in series as an analog switching element, and if the potential of the node 405 is higher than the potential of the node 404, in either case where the potential of node 404 is higher than the potential of node 405, the potential of the input gate 403 can control the current flowing between node 401 and node 402 in an analog manner.

For the analog switching element 110 the circuit of FIG. 2 (*a*) is used in order to block the current flowing from the node 318 to the node 324. Since there is an analog switching element 110 as well as an analog switching element 111, it is possible to efficiently use electric power in a stand-alone mode in which the USB device 106 is charged only by the solar panel 101, which will be described later.

Further, in many cases of the independent power supply system, a reverse current prevention diode is connected in series with the solar cell so that the current does not flow back when the solar panel 101 is not generating power. By blocking the reverse current from the node 318 to the node 324 by the analog switching element 110, No current flows back through 101 when the solar panel 101 is not generating power, even if there is no reverse current prevention diode.

The reverse current prevention diode has 0.4V voltage drop even if the forward voltage drop is small. Therefore, the fact that the reverse current prevention diode is not required suppresses the voltage loss and leads to the improvement of the energy utilization efficiency of the entire system.

However, the reverse current prevention diode is not required when a plurality of solar cells 101 do not exist in parallel. When a plurality of solar cells 101 are arranged in parallel, a reverse current prevention diode is required to prevent backflow from a specific solar cell via another solar cell. In other words, if a plurality of solar cells 101 do not exist in parallel, there is no necessity for the reverse current prevention diode to suppress energy loss and this improves the energy utilization efficiency of the entire system.

FIG. 3 shows an example of the contents of the inverter 117 and the inverter 118. FIG. 3A represents the inverter 117, and FIG. 3B represents the inverter 118. FIG. 3A is composed of an nMOS field effect transistor 211 and a resistor 212. FIG. 3B is comprised of an nMOS field effect transistor 213, a resistor 214, and a pMOS field effect transistor 215.

The source of the nMOS field effect transistor 211 is connected to node 414. The drain of the nMOS field effect transistor 211 is connected to one end of the resistor 212, the node 412. The gate of the nMOS field effect transistor 211 is connected to node 411.

One end of the resistor 212 is connected to the node 413. The other end of the resistor 212 is connected to the drain of the MOS field effect transistor 211, the node 412.

The source of the nMOS field effect transistor 213 is connected to node 418. The drain of the nMOS field effect transistor 213 is connected to one end of the resistor 214, the node 416. The gate of the nMOS field effect transistor 213 is connected to the pMOS field effect transistor 215 and the node 415.

One end of the resistor 214 is connected to the drain of the pMOS field effect transistor 215. The other end of the resistor 214 is connected to the drain of the nMOS field effect transistor 213, the node 416.

The source of the pMOS field effect transistor 215 is connected to node 417. The drain of the pMOS field effect transistor 215 is connected to one end of the resistor 214. The gate of the pMOS field effect transistor 215 is connected to the gate of the nMOS field effect transistor 213, the node 415.

The connection of the inverter 117 in FIG. 1 will be described. The node 311 of FIG. 1 is connected to the node 411 of FIG. The node 312 of FIG. 1 is connected to the node 412 of FIG. The node 314 of FIG. 1 is connected to the node 413 of FIG. The node 315 of FIG. 1 is connected to the node 414 of FIG.

The connection of the inverter 118 in FIG. 1 will be described. The node 312 of FIG. 1 is connected to the node 415 of FIG. The node 313 of FIG. 1 is connected to the node 416 of FIG. The node 314 of FIG. 1 is connected to the node 417 of FIG. The node 315 of FIG. 1 is connected to the node 418 of FIG.

Figure 4:
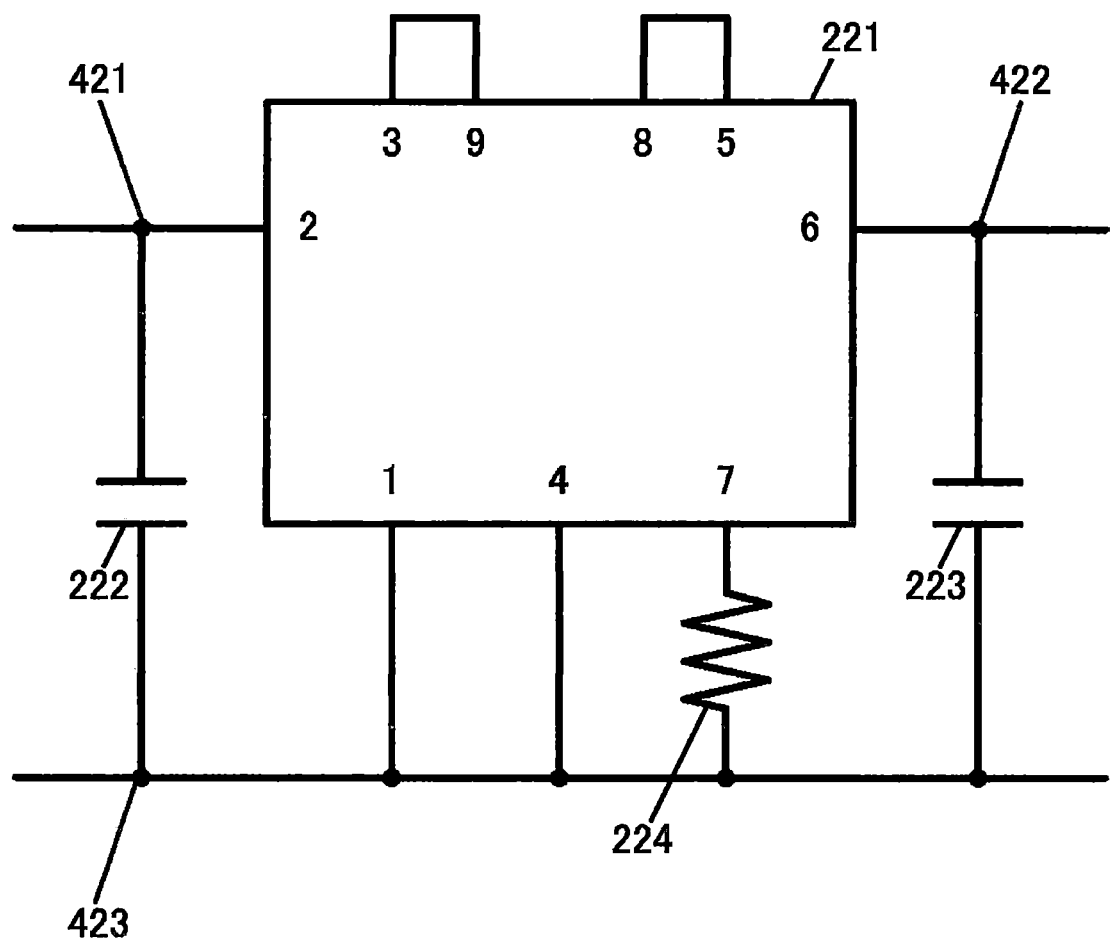
FIG. 4 is an example of connection of a DC-DC converter in FIG. 1.

FIG. 4 shows a connection example of the integrated element of the DC-DC converter. Here, in this example, the DC-DC converter is a non-insulated/step-down type. The integrated element 221 of the DC-DC converter is sold as one component.

Node 421 is a positive input node, node 422 is a positive output node, and node 423 is a negative I/O node. A capacitor 222 is connected between the input node 421 and the negative input/output node 423, and a capacitor 223 is connected between the input node 422 and the negative input/output node 423. In the case of the integrated element of this DC-DC converter, the output voltage can be adjusted by using the resistor 224, but there can be no resistor 224 and the 7th pin of the integrated element 221 of the DC-DC converter can be open.

In this example, the integrated element 221 of the DC-DC converter is connected as follows. Pin 1 is connected to pin 4, the negative terminal of the capacitor 222, the negative terminal of the capacitor 223, one end of the resistor 224, and the node 423. Pin 2 is connected to the positive terminal of capacitor 222, node 421. Pin 3 is connected to pin 9. The 4th pin is connected to the pin1, the negative terminal of the capacitor 222, the negative terminal of the capacitor 223, one end of the resistor 224, and the node 423. Pin 5 is connected to pin 8. Pin 6 is connected to the positive terminal of capacitor 223, node 422. Pin 7 is connected to one end of the resistor 224. Pin 8 is connected to pin 5. Pin 9 is connected to pin 3.

The positive terminal of the capacitor 222 is connected to the second pin of the integrated element 221 of the DC-DC converter, the node 421. The negative terminal of the capacitor 222 is connected to the 1st and 4th pins of the integrated element 221 of the DC-DC converter, the negative terminal of the capacitor 223, one end of the resistor 224, and the node 423.

The positive terminal of the capacitor 223 is connected to the 6th pin of the integrated element 221 of the DC-DC converter, the node 422. The negative terminals of the capacitor 223 are connected to pins 1 and 4 of the integrated element 221 of the DC-DC converter, the negative terminals of the capacitor 222, one end of the resistor 224, and the node 423.

One end of the resistor 224 is connected to pin 7 of the integrated element 221 of the DC-DC converter. The other end of the resistor 224 is connected to the negative terminal of the capacitor 222, the negative terminal of the capacitor 223, the 1st and 4th pins of the integrated element 221 of the DC-DC converter, and the node 423.

Capacitor 222 and capacitor 223 are shown in FIG. 1 but they are also shown in FIG. because they are important. On the other hand, the resistor 224 is not an essential part in this invention, and is therefore omitted in FIG. Capacitor 112 refers to the same as capacitor 222, and capacitor 113 refers to the same as capacitor 223.

The connection of the DC-DC converter 103 of FIG. 1 will be described. The node 322 of FIG. 1A is connected to the node 421. The node 323 of FIG. 1 is connected to the node 422. The node 315 of FIG. 1 is connected to the node 423. The capacitor 112 corresponds to the capacitor 222, and the capacitor 113 corresponds to the capacitor 223.

FIG. 4 is an example of an integrated element of a commercially available DC-DC converter, but when the DC-DC converter is a non-insulated/step-down type, the internal structure is as shown in FIG. The principle will be briefly explained. The switching element 611, the inductor 612, and the rectifying diode 613 are connected as shown in FIG.

Figure 10:
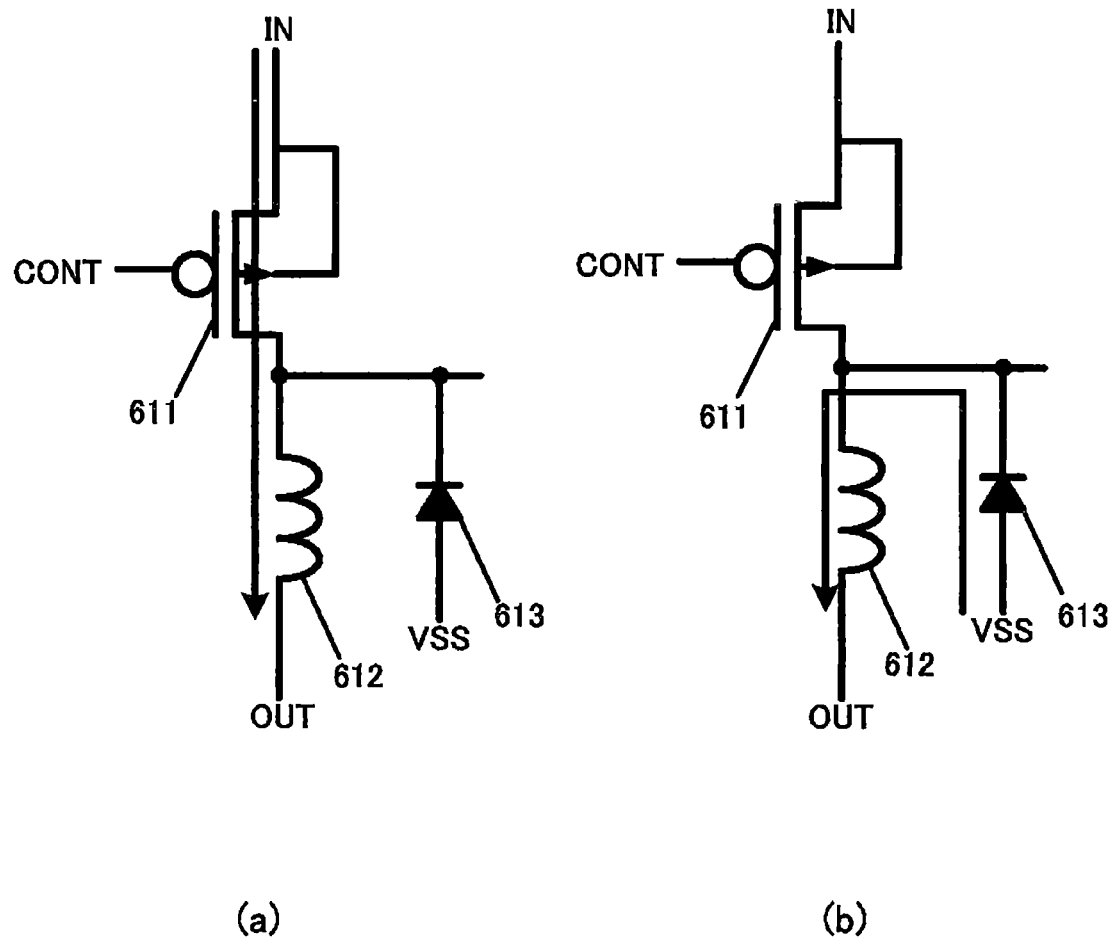
FIG. 10 is a diagram showing the principle of a DC-DC converter.

When the switching element is turned on by CONT, the current flows from IN to OUT via the switching element 611 and the inductor 612 as shown in FIG. 10 (a). When the switching element 611 is turned off by CONT, a current flows from VSS to OUT via the diode 613 and the inductor 612 as shown in FIG. 10 (b).

As shown in FIG. 10B, since there is a current flowing from VSS via the diode 613 and the inductor 612, in the case of the step-down type, the current is larger at the output compared to that of the input, but the voltage is smaller at the output compared to that of the input.

Since the switching element 611 is turned on and off by CONT at several hundred kHz (kilohertz), the inductor 612 may be small, and a capacitor connected to the OUT terminal (not shown in FIG. 10 and connected to the capacitor 223) does not have to be large. Therefore, the DC-DC converter can be made smaller.

Figure 5:
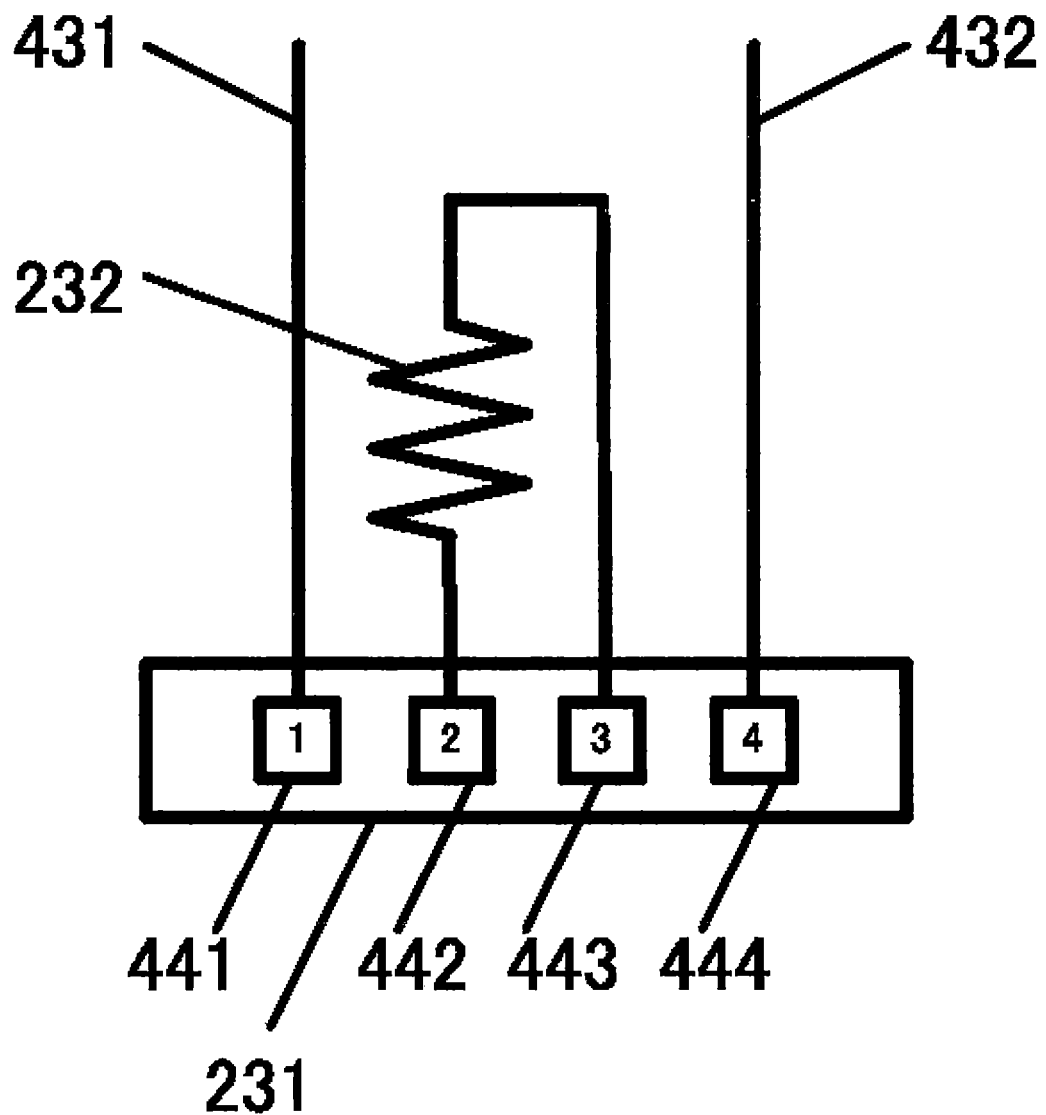
FIG. 5 shows the contents of the USB jack unit.

FIG. 5 shows the details of the USB jack unit. The USB jack unit is comprised of a USB jack 231 and a resistor 232. The USB jack 231 has four terminals 441, 442, 443, and 444. 441 is a power plus terminal (+5V terminal), 442 is a signal minus terminal (data transmission minus terminal), 443 is a signal plus terminal (data transfer plus terminal), and 444 is a power minus terminal (GND terminal).

A resistor 232 is connected between the signal negative terminal (data transmission negative terminal) 442 and the signal positive terminal (data transfer positive terminal) 443. The charging current of general USB 2.0 that is not for charging is 500 mA (milliampere), but by setting the resistor 232 to 200t (ohm), the charging current can be increased to 1.5A (Ampere) . . . . Since the structure of the USB jack portion 231 is simple, the description of the connection will be omitted.

Figure 6:
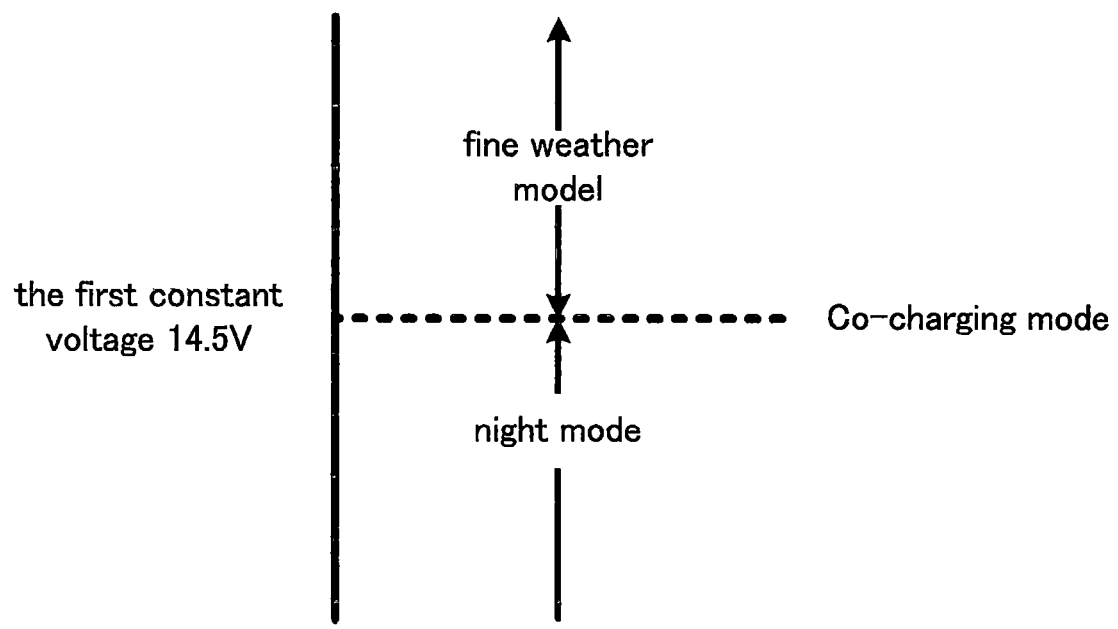
FIG. 6 is a diagram showing the relationship between the detection result of the input voltage and the operation mode.

Next, the operation of the cooperative charging system in the present embodiment will be described. The operation differs depending on the voltage between the node 315 and the node 322. FIG. 6 shows the difference in operation depending on the voltage between the node 315 and the node 322. The mode names mentioned here are not general terms but terms unique to this document.

When the voltage between the node 315 and the node 322 is smaller than the first constant voltage value, we call it the night mode. When the voltage between the node 315 and the node 322 is equal to the first constant voltage value and power can be obtained from the commercial AC power supply 102 or the mobile battery 127, we call it the cooperative charging mode. When the voltage between the node 315 and the node 322 is larger than the first constant voltage value, we call it the fine weather mode. In addition, although not shown in FIG. 6, when the voltage between the node 315 and the node 322 is equal to the first constant voltage value and power cannot be obtained from the commercial AC power supply 102 or the mobile battery 127, we call it the stand-alone mode.

In night mode, the USB device 106 is charged from the commercial AC power supply 102 via the AC adapter 104, or when power is obtained from the mobile battery 127, from the commercial AC power supply 102 via the AC adapter 104, or from the mobile battery 127. It's the night mode when the solar panel 101 is not generating electricity. The co-charging mode is based on the premise that a commercial AC power supply can be obtained, and is mode in which the USB device 106 is charged by two routes, these are via "the one selected by the mechanical switch 125 from the commercial AC power supply 102, the AC adapter 104, or the mobile battery 127" and via the solar panel 101 and the DC/DC converter 103. When power is obtained from "commercial AC power supply 102, via AC adapter 104, or via mobile battery 127, whichever is selected by the mechanical switch 125", and the solar panel 101 is generating power, but the requested electric power of the USB device 106 cannot be supplied by the solar panel 101 itself, it is the cooperative charging mode.

The fine weather mode is a mode in which the USB device 106 is charged via the solar panel 101 and the DC-DC converter 103. When the solar panel 101 is generating power and the required power of the USB device 106 can be covered by the solar panel 101 itself, it is the fine weather mode. In the stand-alone mode, the USB device 106 is charged via the solar panel 101 and the DC-DC converter 103 as in the fine weather mode, but there is no power supply from the commercial AC power supply 102, and the USB device uses the power generated by the solar panel 101 and all the power required by the USB device 106 is not supplied.

First, the night mode will be explained. In the night mode, since the voltage between the node 315 and the node 322 is smaller than the first constant voltage value, the potential of the node 311 formed by being divided by the resistor 115 and the resistor 116 becomes low. Therefore, the potential of the node 312, which is the output of the inverter 117, becomes H (high). Then, the potential of the node 313, which is the output of the inverter 118, becomes L (low). Therefore, the analog switching element 110 is turned off, and the analog switching element 111 is turned on. In this state, the USB device 106 is charged via the "commercial AC power supply 102, via the AC adapter 104, or via the mobile battery 127, whichever is selected by the mechanical switch 125". On the other hand, the USB device 106 is not charged via the solar panel 101 and the DC-DC converter 103. A current is supplied to the inverter 117 and the inverter 118 from the node 317 via the rectifying diode 120 or from the node 319 via the rectifying diode 123. Many independent power supply systems require a backflow prevention diode connected in series with the solar cell, but in night mode, the analog switching element 110 is turned off and the field effect transistor connected in series with the source reversed prevent current backflow, so the backflow prevention diode becomes unnecessary when the solar cells are not connected in parallel.

Next, the cooperative charging mode will be described. The cooperative charging mode is based on the premise that power is supplied from the commercial AC power supply 102 and "the AC adapter 104 or the mobile battery 127 selected by the mechanical switch 125" is connected. In the co-charging mode, the voltage between the node 315 and the node 322 becomes the first constant voltage value, so that the potential of the node 311 formed by being divided by the resistor 115 and the resistor 116 becomes close to the inversion reference value of the inverter 117. Therefore, the potential of the node 312, which is the output of the inverter 117, and the potential of the node 313, which is the output of the inverter 118, are intermediate values that are neither H (high) nor L (low). Therefore, the analog switching element 110 and the analog switching element 111 are turned on while limiting the current. Power is supplied to the inverters 117 and 118 from any of the nodes 316, 317, and 318 via the rectifying diode 119, the rectifying diode 120, and the rectifying diode 123.

In the cooperative charging mode, when the amount of power generated by the solar panel 101 increases, the voltage between the node 315 and the node 322 works so as to be larger than the first constant voltage value. As a result, the potential of the node 311 formed by being divided by the resistor 115 and the resistor 116 becomes high. As a result, the potential of the node 312, which is the output of the inverter 117, decreases, and the potential of the node 313, which is the output of the inverter 118, increases. Therefore, the analog switching element 110 works to increase the current, and the analog switching element 111 works to decrease the current. As a result, the voltage between the node 315 and the node 322 becomes the first constant voltage value. In the cooperative charging mode, when the amount of power generated by the solar panel 101 increases, the analog switching element 111 works to reduce the current. Therefore, The output current from the one selected by the mechanical switch 125 from "commercial AC power supply 102, via AC adapter 104, or via mobile battery 127". In other words, as the solar output current increases, the output current of the AC adapter or mobile battery decreases.

In the co-charging mode, when the amount of power generated by the solar panel 101 decreases, the voltage between the node 315 and the node 322 works so as to be smaller than the first constant voltage value. As a result, the potential of the node 311 divided by the resistor 115 and the resistor 116 becomes low. As a result, the potential of the node 312, which is the output of the inverter 117, rises, and the potential of the node 313, which is the output of the inverter 118, falls. Therefore, the analog switching element 110 works to reduce the current, and the analog switching element 111 works to increase the current. As a result, the voltage between the node 315 and the node 322 becomes the first constant voltage value. In the co-charging mode, when the amount of power generated by the solar panel 101 decreases, the analog switching element 111 works to increase the current, so the output current of "the AC adapter 104 or the mobile battery 127 selected by the mechanical switch 125" will increase. In other words, as the solar output current decreases, the output current of the AC adapter or mobile battery increases.

As described above, if the solar panel 101 is generating power, and "power is supplied from the commercial AC power supply 102, and the AC adapter 104 is selected by the mechanical switch 125" or "power is supplied from the mobile battery 127 and the mobile battery is selected by the mechanical switch 125 "and the required power of the USB device 106 cannot be covered by the solar panel 101 alone, it is the co-charging mode and the voltage between the node 315 and the node 322 becomes the first constant voltage value.

In the cooperative charging mode, most of the electric power generated by the solar panel 101 is converted by the DC-DC converter 103 and consumed by the USB device 106. Of the power consumed by the USB device 106, the insufficient power by the solar panel 101 is supplied from "the AC adapter 104 or the mobile battery 127 selected by the mechanical switch 125".

FIG. 7 shows the relationship among simulated solar input current i.e. the output current of the DC power supply simulating the solar panel 101, the simulated solar output current i.e. the measured current of the ammeter 121, and "the one selected by the mechanical switch 125 from AC adapter 104 or mobile battery 127" i.e. the measured current of the ammeter 122. When the simulated solar input current is 0, the simulated solar output current is zero, and it can be seen that the simulated solar output current increases as the simulated solar input current increases. When the simulated solar input current is 0, the output current of "the AC adapter 104 or the mobile battery 127 selected by the mechanical switch 125" increases, and as the simulated solar input current increases, "It can be seen that the output current of "the one selected by the mechanical switch 125 of the AC adapter 104 or the mobile battery 127" decreases. Whichever of the AC adapter 104 or the mobile battery 127 selected by the mechanical switch 125, the characteristics are almost the same.

The simulated solar input current is from 0.02 A (ampere) to 0.40 A (ampere), corresponds to the simulated solar input voltage i.e. the voltage of the solar panel 101 is 14.4 V (volt) to 14.9 V (volt), but the point that simulated solar input current is 0.43A (ampere) corresponds to the simulated solar input voltage is 19.1V (volts) so the simulated solar panel output current has increased significantly. The point where the simulated solar input current is 0.00A (ampere) and 0.43A (ampere) is not the cooperative charging mode. The points where the simulated solar input current is 0.00A (ampere) and 0.43A (ampere) are the night mode and the fine weather mode, respectively. This voltage, which is substantially constant from 14.2 V (volt) to 14.8 V (volt), is the first constant voltage value. Even if there is a slight change in the range due to the influence of wiring resistance or the like, it is regarded as a constant voltage value.

Next, the fine weather mode will be described. In the fine weather first mode, since the voltage between the node 315 and the node 322 is larger than the first constant voltage value, the potential of the node 311 formed by being divided by the resistor 115 and the resistor 116 becomes high. Therefore, the potential of the node 312, which is the output of the inverter 117, becomes L (low). Then, the potential of the node 313, which is the output of the inverter 118, becomes H (high). Therefore, the analog switching element 110 is turned on, and the analog switching element 111 is turned off. In this state, the USB device 106 is not charged by "the one selected by the mechanical switch 125 from the commercial AC power supply 102 via the AC adapter 104 or the mobile battery 127". On the other hand, the USB device 106 is charged via the solar panel 101 and the DC-DC converter 103. A current is supplied to the inverter 117 and the inverter 118 from the node 316 via the rectifying diode 119.

Finally, although not shown in FIG. 6, the stand-alone mode will be described. Stand-alone mode is the case when "Mechanical switch 125 has selected the AC adapter and no power is supplied from the commercial AC power supply 102 or AC adapter 104 is not connected, or mechanical switch 125 has the mobile battery 127 selected and the mobile battery 127 is full, etc." and the voltage between the node 315 and the node 322 is the first constant voltage value. In the stand-alone mode, the voltage between node 315 and node 322 becomes the first constant voltage value, so the potential of node 311 formed by dividing by resistors 115 and 116 becomes close to the inversion reference value of inverter 117. Therefore, the potential of the node 312 which is the output of the inverter 117 and the potential of the node 313 which is the output of the inverter 118 are intermediate values that are neither H (high) nor L (low). Therefore, the analog switching element 110 is turned on while limiting the current.

In the stand-alone mode, when the amount of power generated by the solar panel 101 increases, the voltage between the node 315 and the node 322 works so as to be larger than the first constant voltage value. As a result, the potential of the node 311 formed by being divided by the resistor 115 and the resistor 116 becomes high. As a result, the potential of the node 312, which is the output of the inverter 117, decreases (the potential of the node 313, which is the output of the inverter 118, increases). Therefore, the analog switching element 110 works to increase the current. As a result, the voltage between the node 315 and the node 322 becomes the first constant voltage value.

In the stand-alone mode, when the amount of power generated by the solar panel 101 decreases, the voltage between the node 315 and the node 322 works so as to be smaller than the first constant voltage value. As a result, the potential of the node 311 divided by the resistor 115 and the resistor 116 becomes low. As a result, the potential of the node 312, which is the output of the inverter 117, rises (the potential of the node 313, which is the output of the inverter 118, falls). Therefore, the analog switching element 110 works to reduce the current. As a result, the voltage between the node 315 and the node 322 becomes the first constant voltage value.

As described above, the solar panel 101 is generating power, and "when the mechanical switch 125 has the AC adapter selected and power is not supplied from the commercial AC power supply 102 or the AC adapter 104 is not connected", "in the case of mechanical switch 125 has selected the mobile battery 127 and the mobile battery 127 has no remaining power, etc.," and the required power of the USB device 106 cannot be covered by the solar battery 101 alone, it is the stand-alone mode and the node between node 315 and the nodes 322 becomes the first constant voltage value. When the required power of the USB device 106 can be covered only by the solar panel 101, it is the fine weather first mode.

In the stand-alone mode, most of the electric power generated by the solar panel 101 is converted by the DC-DC converter 103 and consumed by the USB device 106. However, in the stand-alone mode, all the power required by the USB device 106 is not supplied.

In the stand-alone mode, the presence of the analog switching element 110 intentionally suppresses the current for charging the USB device 106, keeps the voltage between the nodes 315 and 322 high to some extent, and as a result, secure the current for charging the USB device 106. If there is no analog switching element 110, the DCDC converter 103 tries to charge the USB device 106 as much as possible, and the voltage between the node 315 and the node 322 drops, and the current for charging the USB device 106 may decrease.

Figure 8:
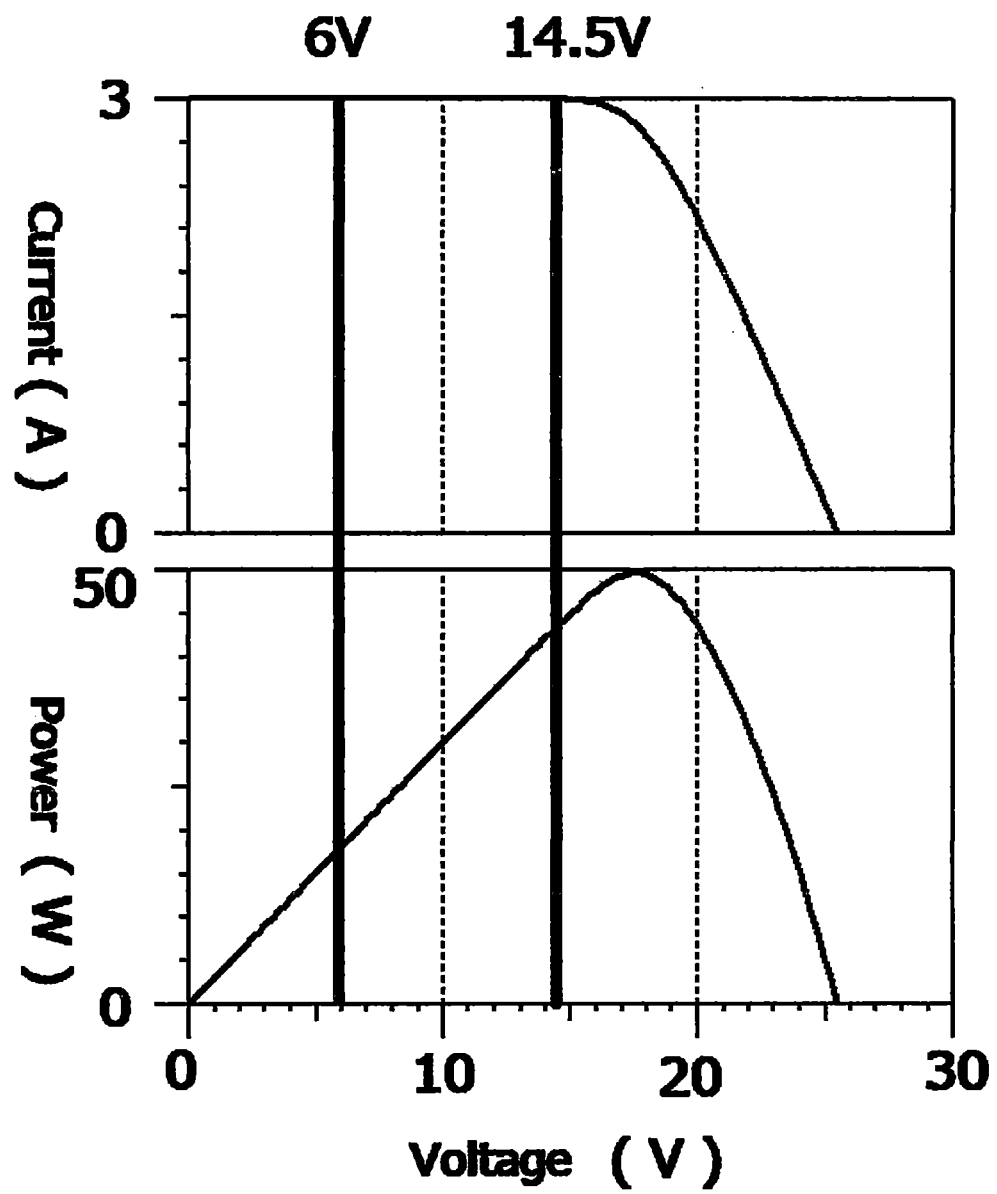
FIG. 8 shows the relationship between the voltage across the output terminal of the solar cell and the current and electric power that can be taken out.

FIG. 8 shows the relationship between the voltage across the solar cell and the current and electric power that can be taken out. The maximum power can be taken out when the voltage across the solar cell is around 17V. If there is no analog switching element 110 in the stand-alone mode, the DCDC converter 103 is often controlled so that the voltage of the solar panel 101 is slightly higher than the output voltage of 5V, for example, about 6V.

On the other hand, when the analog switching element 110 is present, the analog switching element 110 does not turn on unless the voltage of the solar panel 101 is higher, for example, about 14.5 V due to the feedback control. As shown in FIG. 8, when the voltage of the solar panel 101 is higher, for example, about 14.5 V, a larger amount of electric power can be taken out. A voltage slightly smaller than the maximum voltage of 17V is suitable for the solar panel 101 because of a decrease in the output voltage of the solar cell due to a temperature rise, a voltage drop due to a backflow prevention diode when connecting a plurality of solar cells, and a voltage due to wiring.

Next, the usage method in the first embodiment will be described. Examples of the charging target device used in the USB device 106 include a smartphone and a tablet. When the charging target device used for the USB device 106 can be charged, it is always continuously charged toward full charging. The charging target device used for the USB device 106 is charged in all modes shown in FIG. 7 when power is supplied from "the one selected by the mechanical switch 125 from the commercial AC power supply 102 via the AC adapter 104 or the mobile battery 127". The power to be charged is supplied by the solar panel 101 or "the one selected by the mechanical switch 125 from the commercial AC power supply 102 via the AC adapter 104 or the mobile battery 127" or both.

In all modes listed in FIG. 6, in most cases, the battery is charged from the solar panel 101 or "the one selected by the mechanical switch 125 from the commercial AC power supply 102 via the AC adapter 104 or the mobile battery 127" or both. However, if the solar panel 101 is not generating power and power is not supplied from "the one selected by the mechanical switch 125 from the commercial AC power supply 102 via the AC adapter 104 or the mobile battery 127", the USB device 106 will not be charged.

A general independent power supply system includes a 12V type battery such as a lead storage battery, but the charging system of this invention does not include a 12V type battery. Therefore, there is no need for depreciation of 12V batteries. In addition, the system is lighter because there is no lead-acid battery. Further, regarding the path of direct charging from the solar cell, it is a DC power supply in which the charging target is charged without being converted into alternating current from the solar panel even once, and voltage conversion is performed only once, so that there is no waste.

In the system of this invention, the mechanical switch 125 can select the other power supply device an addition to the solar panel 101. The AC adapter 104 or the mobile battery 127 can be selected as the power supply device as the other device of the solar panel 101. When the mechanical switch 125 selects the AC adapter 104, the solar panel 101 and the AC adapter 104 are co-charged, and when the mechanical switch 125 selects the mobile battery 127, the solar panel 101 and the mobile battery 127 co-charges. There is a usage like when there is a system indoors in other case than during a power outage or disaster, the AC adapter 104 is connected to the commercial power supply 102, the mechanical switch 125 selects the AC adapter 104, and the solar panel 101 and the AC adapter 104 are co-charged and in the event of a power outage, disaster, camp, etc., the mechanical switch 125 can be used to select the mobile battery 127 and solar panel 101 and the mobile battery 127 co-charges.

The capacitor used in the co-charging system of this invention will be described. Capacitors may be called "condenser" in Japanese. The large-capacity capacitor 124 will be described later. Capacitors are installed at 112, 113, 114. The DC-DC converter is usually instructed to connect capacitors to the input side and the output side, respectively. This is to reduce the ripple due to switching. Ripple is a periodic vibration of voltage that occurs mainly during switching. Normally, an electrolytic capacitor+ ceramic capacitor is connected to the input side, and an electrolytic capacitor is connected to the output side. Electrolytic capacitors have excellent cost per capacitance, and ceramic capacitors have excellent high frequency response.

A capacitor is used for 112 as an input and 113 as an output of the DC-DC converter 103. Also, if a capacitor is installed just before the USB jack, the noise transmitted to the USB device to be charged can be reduced. Since there is an analog switching element 110 or the like between the USB jack 105 and the capacitor 113, it is preferable to install the capacitor 114 for voltage stability. The capacitor 114 also has the effect of reducing noise from "the one selected by the mechanical switch 125 from the commercial AC power supply 102 via the AC adapter 104 or the mobile battery 127". However, if the capacity of the capacitor 114 is too large, charging may not start immediately when the USB device 106 is connected from the USB jack 105 after being left in a state where the USB device 106 is removed from the USB jack 105.

Examples of suitable capacitors are an electrolytic capacitor 1000uF (microfarad)+ceramic capacitor 0.1uF (microfarad) for 112, two electrolytic capacitors 470uF (microfarad) for 113, and an electrolytic capacitor 470uF (microfarad)+ceramic capacitor 0.1uF for 114. It works without connecting a capacitor like this, but for high quality output, capacitors should also be considered. By connecting the capacitors in this way, a charging system with less noise and ripple is provided.

An example inferior to this invention is shown. In the example of the integrated element 221 of the DC-DC converter shown in FIG. 4, pin 1 is a standby terminal, and when H (high) is given, the integrated element 221 of the DC-DC converter can be stopped. Taking advantage of this, when the voltage between the node 315 and the node 322 becomes smaller than the first constant voltage value, H (high) is given to the 1st pin which is the standby terminal, and feedback can be performed to stop the DC-DC converter 103.

However, in this method, especially in the stand-alone mode, the period during which the DC-DC converter 103 operates and the period during which the DC-DC converter 103 stops are continuous for a certain long time with respect to the voltage change between the node 315 and the node 322. A certain long time is, for example, about 10 ms (milliseconds). Therefore, in the stand-alone mode, the voltage supplied to the USB device 106 via the USB jack 105 has a large ripple. The co-charging system according to this invention provides a charging system with less noise and ripple than this inferior example.

As already mentioned, without the analog switching element 110, the power efficiency becomes poor in the stand-alone mode, and when the analog switching element 110 is composed of only one pMOS field effect transistor, the analog switching element 110 can not stop the current flowing in the direction from the node 318 to the node 316 even if there is only one solar panel 101, the solar panel 101 needs a reverse current protection diode, and the voltage drop of the reverse current protection diode deteriorates the power utilization efficiency. This invention provides a charging system with good power utilization efficiency.

When the USB device 106 to be charged continues to be disconnected from the USB jack 105 and then the USB device 106 to be charged is connected to the USB jack 105 again, power does not be supplied from the mobile battery 127.

First, in order for the control circuit 501 to operate, it is necessary that power is supplied to the power supply node 314 of the control circuit. If power is not supplied to the power node 314 of the control circuit, charging of the USB device 106 will not start even if the state of not connecting the USB device 106 to the USB jack 105 changes to the state of connecting to the USB jack 105. Therefore, it is important that power is always supplied to the power node 314 of the control circuit.

In addition to that, a resistor 126 or the like is required as an element for passing a current from the power supply node 314 to the charging node 318. First, it will be described that power should be always supplied to the node 314.

The following three measures are taken so that power is always supplied to node 314. These ideas are an important part of this invention.

(1) Connect the diode so that current flows from the power supply supplied from the solar cell, the power supply supplied from the AC adapter, the power supply supplied from the mobile battery, to the power supply node of the control circuit. By doing so, if power is supplied from at least one of the solar cell, the AC adapter, and the mobile battery, the power of the control circuit is supplied.

(2) Connect a large-capacity capacitor such as an electric double layer capacitor to the power supply of the control circuit. By doing so, the power supply of the control circuit is maintained for a certain period of time even if the power is not supplied in (1).

(3) The inverter 117 has an nMOS field-effect transistor+ resistor configuration, and the inverter 118 has an nMOS field-effect transistor+resistor+pMOS field-effect transistor configuration. By doing so, the consumption of the power supply of the control circuit during the period when the power is not supplied in (1) is suppressed.

If all of the above three ideas are performed, the obtained effect is not simple addition of above, but a very large effect that the period during which power is supplied to the power node 314 can be made very close to 100% can be obtained. Each will be described in detail below.

First, I will explain about (1).

Node 314, which is a node that supplies power to the inverter 117 and the inverter 118, is referred to as a power supply node of the control circuit.

A diode 119 is connected between the node 316 and the power supply node 314 of the control circuit. The node 316 is supplied with power from the solar panel 101 in fine weather mode. The anode of the diode 119 is connected to the node 316 and the cathode of the diode 119 is connected to the power supply node 314 of the control circuit.

The diode 120 is connected between the node 317 and the power supply node 314 of the control circuit. The node 317 is supplied with power from the commercial power supply 102 when "the AC adapter 104 is connected to the commercial power supply 102 and the jack 107" except during a power failure or disaster. The anode of the diode 120 is connected to the node 317 and the cathode of the diode 120 is connected to the power supply node 314 of the control circuit.

The diode 123 is connected between the node 319 and the power supply node 314 of the control circuit. A mobile battery 127 is connected to the jack 108 of the node 319, and power is supplied from the mobile battery 127 when "the mobile battery 127 has sufficient power remaining and is not disconnected from the mobile battery". The anode of the diode 123 is connected to node 319 and the cathode of the diode 123 is connected to the power supply node 314 of the control circuit.

As described above, if power is supplied from at least one of the solar panel 101, the AC adapter 104, and the mobile battery 127, the power node 314 of the control circuit is supplied. The solar panel 101, the AC adapter 104, and the mobile battery 127 are power supply sources having completely different characteristics from each other. FIG. 9A summarizes the conditions under which power is supplied from each power source.

First, regarding the solar panel 101. The condition in which electric power is supplied from the solar panel 101, in other word, the condition in which the solar panel 101 generates electric power is that there is sunshine. There is sunshine in the daytime. No sunshine is available at night. In the daytime, it naturally generates electricity in fine weather, but even in the case of cloudy weather or rain, it can supply as much electricity as normally consumed by the control circuit. Thus, the power is supplied from the solar panel 101 in the daytime, and the power is not supplied from the solar panel 101 at night.

Next is the AC adapter 104. The condition for supplying power from the AC adapter 104 is a normal time when the system is used in the home, the AC adapter 104 is connected to the commercial power supply 102, and no power failure or disaster occurs. The conditions under which power is not supplied from the AC adapter 104 include cases where power is not supplied to the commercial power supply 102 due to a power outage or disaster, or when the system is used outdoor like when it is brought to the camp and cannot be connected to the commercial power supply 102.

Finally, regarding the mobile battery 127. The condition for supplying power from the mobile battery 127 is that the mobile battery has a remaining capacity and is not disconnected from the mobile battery (described later). The condition that power is not supplied from the mobile battery 127 is that the mobile battery is empty or disconnected from the mobile battery. The mobile battery will stop supplying power shortly after the device to be charged is removed.

In addition to the above, if a failure occurs in the solar panel 101, the AC adapter 104, the mobile battery 127, or wiring connection work is conducted, power will not be supplied. In this way, if power is supplied from a combination of power supply sources having completely different characteristics, such as a solar panel 101, an AC adapter 104, and a mobile battery 127, power can be supplied to the power node 314 of the control circuit. By doing so, the period during which power can be supplied to the power node 314 of the control circuit can be approached to 100%.

Next, I will explain about (2).

A large-capacity capacitor 124 such as an electric double layer capacitor is connected the power supply node 314 of the control circuit. When it is estimated that the power supply node 314 of the control circuit is supplied in the daytime according to (1), it suffices if the necessary power can be supplied during the nighttime 12 hours.

Assuming that the current consumption of the control circuit during the period when power is not supplied in (1) is 1 µA (microampere) and the voltage of the power supply node 314 of the control circuit drops to 0.5 V, the system is operated for 12 hours. The capacitance of the capacitor 124 required to maintain is charge (C, Coulomb)=capacitance (F, Farad)×voltage (V, volt), charge (C, Coulomb)=current (A, amperes) x time (seconds).), Capacitor (F, Farad)=current (A, amperes) x time (seconds)/voltage (V). When this is calculated, it becomes $(1\times10^{-6})$ (A ampere)×(12×60×60) (seconds)/0.5 (V·volt)=0.0864 (F. Farad). That is, it is sufficient to have a capacitor having a capacity of about 0.1 F (farad).

As the large-capacity capacitor 124, an electric double layer capacitor is suitable as of 2020. As of 2020, 1F (Farad) electric double layer capacitors can be obtained at a price of about 100 yen(about 1 dollar) even if they are purchased individually. Even if a high-performance capacitor other than the electric double layer capacitor appears in the future and the capacitor 124 is replaced with a capacitor that appears in the future, it is within the scope of this invention.

Next, I will explain about (3).

The circuit configurations of the inverter 117 and the inverter 118, which are control circuits, will be described. The inverter in this invention is an element having a logic inversion function, and an inverter which is an element/device having a function of converting direct current into alternating current is irrelevant here.

FIG. 3A shows the contents of the inverter 117. FIG. 3B shows an example of the contents of the inverter 118. FIG. 3A is composed of an nMOS field effect transistor 211 and a resistor 212. FIG. 3B is composed of an nMOS field effect transistor 213, a resistor 214, and a pMOS field effect transistor 215.

The source of the nMOS field effect transistor 211 is connected to node 414. The drain of the nMOS field effect transistor 211 is connected to one end of the resistor 212, the node 412. The gate of the nMOS field effect transistor 211 is connected to node 411.

One end of the resistor 212 is connected to the node 413. The other end of the resistor 212 is connected to the drain of the nMOS field effect transistor 211, the node 412.

The source of the nMOS field effect transistor 213 is connected to node 418. The drain of the nMOS field effect transistor 213 is connected to one end of the resistor 214, the node 416. The gate of the nMOS field effect transistor 213 is connected to the gate of the pMOS field effect transistor 215, the node 415.

One end of the resistor 214 is connected to the drain of the pMOS field effect transistor 215. The other end of the resistor 214 is connected to the drain of the nMOS field effect transistor 213, the node 416.

The source of the pMOS field effect transistor 215 is connected to node 417. The drain of the pMOS field effect transistor 215 is connected to one end of the resistor 214. The gate of the pMOS field effect transistor 215 is connected to the gate of the nMOS field effect transistor 213, the node 415.

The connection of the inverter 117 and the inverter 118 in FIG. 1 will be described. The node 311 of FIG. 1 is connected to the node 411 of FIG. 3 (*a*). The node 312 of FIG. 1 is connected to the node 412 of FIG. 3 (*a*) and the node 415 of FIG. 3 (*b*). The node 313 of FIG. 1 is connected to the node 416 of FIG. 3 (*b*). The node 314 of FIG. 1 is connected to the node 413 of FIG. 3 (*a*) and the node 417 of FIG. 3 (*b*). The node 315 of FIG. 1 is connected to the node 414 of FIG. 3 (*a*) and the node 418 of FIG. 3 (*b*).

The output node of the inverter 118, which is a signal node that controls the analog switching element 111, outputs the node 416 between the drain of the nMOS field effect transistor 213 and the resistor 214, as shown in FIG. 3 (*b*). It does not output the node between the drain of the pMOS field effect transistor 215 and the resistor 214. The output of the node between the drain of the nMOS field effect transistor 213 and the resistor 214 is connected to the charging current node in the cooperative charging mode, because total current from solar panel 101 and "AC adapter 104 or the mobile battery 127 selected by the switch 125" can be increased.

The inverter 117 has an nMOS field-effect transistor+resistor configuration, and the inverter 118 has an nMOS field-effect transistor+resistor+pMOS field-effect transistor configuration. Therefore, in all modes including the cooperative charging mode, power consumption of the inverter 117 and the inverter 118 can be suppressed to middle level and the current consumption of the inverter 117 and the inverter 118 in the night mode can be suppressed to a small value.

To explain this, as shown in FIG. 9B, it is assumed that the first inverter (inverter 117) and the second inverter (inverter 118) are considered in three ways.

In the CMOS type, the first inverter (inverter 117) is composed of an nMOS type field effect transistor+pMOS type field effect transistor, and the second inverter (inverter 118) is also composed of an nMOS type field effect transistor+pMOS type field effect transistor. This configuration is widely available because it is distributed as an IC package in which a plurality of inverters are integrated.

In the nMOS type, the first inverter (inverter 117) is composed of an nMOS type field effect transistor+resistor, and the second inverter (inverter 118) is also composed of an nMOS type field effect transistor+resistor.

In the type of this invention, the first inverter (inverter 117) is composed of an nMOS type field effect transistor+resistor, and the second inverter (inverter 118) is composed of an nMOS type field effect transistor+resistor+pMOS type field effect transistor.

An inverter using an nMOS type field effect transistor+pMOS type field effect transistor has a small current consumption when the input potential is near VSS, a large current consumption when the input potential is intermediate between VSS and VDD, and a small current consumption when the input potential is near VDD. The nMOS field effect transistor+resistor inverter consumes a small amount of current when the input potential is near VSS, and the current consumption is medium when the input potential is between VSS and VDD, and current consumption is medium when the input potential is near VDD.. An inverter with an nMOS field effect transistor+resistor+pMOS field effect transistor consumes a small amount of current when the input potential is near VSS, and has a medium current consumption when the input potential is medium between VSS and VDD, the current consumption becomes small near VDD.

To make the image easier to understand, I give specific numerical examples. Here, a small current consumption means about 1 µA (microampere), a medium current consumption means about 30 µA (microampere), and a large current consumption means about 20 mA (milliampere). This is just an example and varies greatly depending on the element selection. Also, although this number is based on market research, it was not evaluated by the inventor himself.

Before discussing each current consumption, the definitions of night mode, cooperative charging mode, fine weather mode, and stand-alone mode will be briefly explained again, and the potential of node 311 will be explained.

In the night mode, the solar panel 101 is not generating electricity, and the potential of the node 322 is low (usually near 0V), so that the potential of the node 311 is also low (usually 0V).

In the cooperative charging mode, power is supplied from "the side of the AC adapter or mobile battery selected by switch 125", and the power from the solar battery 101 is insufficient for charging, the solar battery and "the side of the AC adapter or mobile battery selected by switch 125" cooperate to charge the USB device 106. In the co-charging mode, since the feedback works, the potential of the node 322 becomes high to some extent (for example, 14.5V), and the potential of the node 311 becomes an intermediate potential.

The fine weather mode is a mode in which the USB device 106 is charged only by the solar panel 101 because the power from the solar panel 101 can supply all the power for charging the USB device 106. In fine weather mode, the potential of node 322 is high (e.g. 19V) and the potential of node 311 is high (usually VDD).

In the stand-alone mode, power is not supplied from "the side of the AC adapter or mobile battery selected by switch 125", and the power from the solar panel 101 is insufficient for charging, the USB device 106 is charged only by the electric power from the solar panel 101. Since there is an analog switching element 110, an appropriate input voltage (node 322) of the DCDC converter 103 can be adjusted, and the DCDC converter 103 can efficiently convert power even in the stand-alone mode to charge the USB device 106. In the stand-alone mode, as in the cooperative charging mode, the feedback works, so that the potential of the node 322 becomes high to some extent (for example, 14.5V), and the potential of the node 311 becomes an intermediate potential.

Based on the above, the current consumption will be discussed by each method defined in FIG. 9 (*b*).

Discuss the CMOS type. In the night mode, the first inverter (inverter 117) consumes a small amount of current because the input has a low potential, and the second inverter (inverter 118) consumes a small amount of current because the input has a high potential, thus the total current consumption is small. In the co-charging mode, the first inverter (inverter 117) consumes a large amount of current because the input is an intermediate potential, and the second inverter (inverter 118) consumes a large amount of current because the input is an intermediate potential, thus the total current consumption is large. In the fine weather mode, the first inverter (inverter 117) consumes a small amount of current because the input has a high potential, and the second inverter (inverter 118) consumes a small amount of current because the input has a low potential, thus the total current consumption is small. In the stand-alone mode, the first inverter (inverter 117) consumes a large amount of current because the input is an intermediate potential, and the second inverter (inverter 118) consumes a large amount of current because the input is an intermediate potential, thus the total current consumption is large.

Discuss the nMOS type. In the night mode, the first inverter (inverter 117) consumes a small amount of current because the input has a low potential, and the second inverter (inverter 118) consumes a medium amount of current because the input has a high potential, thus the total current consumption is medium. In the co-charging mode, the first inverter (inverter 117) consumes medium current because the input is intermediate potential, and the second inverter (inverter 118) consumes medium current because the input is intermediate potential, thus the total current consumption is medium. In fine weather mode, the first inverter (inverter 117) consumes a medium amount of current because the input has a high potential, and the second inverter (inverter 118) consumes a small amount of current because the input has a low potential thus the total current consumption is medium. In the stand-alone mode, the first inverter (inverter 117) consumes medium current because the input is intermediate potential, and the second inverter (inverter 118) consumes medium current because the input is intermediate potential, thus, the total current consumption is medium.

Discuss this invention type. In the night mode, the first inverter (inverter 117) consumes a small amount of current because the input has a low potential, and the second inverter (inverter 118) consumes a small amount of current because the input has a high potential, thus the total consumption current is small. In the co-charging mode, the first inverter (inverter 117) consumes medium current because the input is intermediate potential, and the second inverter (inverter 118) consumes medium current because the input is intermediate potential, thus the total current consumption is medium. In fine weather mode, the first inverter (inverter 117) consumes a medium amount of current because the input has a high potential, and the second inverter (inverter 118) consumes a small amount of current because the input has a low potential, thus the total current consumption is medium. In the stand-alone mode, the first inverter (inverter 117) consumes medium current because the input is intermediate potential, and the second inverter (inverter 118) consumes medium current because the input is intermediate potential, thus the total current consumption is medium.

The above is summarized in FIG. 9 (c).

In all modes including the cooperative charging mode, this invention type can suppress the current consumption of the first inverter (inverter 117) and the second inverter (inverter 118) to a medium level or less. Therefore, electric power can be efficiently used in all modes including the cooperative charging mode. In modes other than the night mode, since the solar cell is generating power, if the current consumption of the first inverter (inverter 117) and the second inverter (inverter 118) is medium, the current consumption of the first inverter (inverter 117) and the second inverter (inverter 118) can be suppressed to be smaller than the power consumption supplied to node 314.

Further, this invention type can suppress the current consumption of the first inverter (inverter 117) and the second inverter (inverter 118) in the night mode to a small value. In night mode, the solar cells are not generating electricity. Therefore, the power supply of all three places discussed in (1): the power supply from the solar cell, the power supply from the AC adapter, the power supply from the mobile battery can be stopped and rely on the large capacity capacitor 124. Therefore, it is important to keep the current consumption of the first inverter (inverter 117) and the second inverter (inverter 118) in the night mode small.

From the above discussion, it is appropriate that the inverter 117 has an nMOS field-effect transistor+resistor configuration, and the inverter 118 has an nMOS field-effect transistor+resistor+pMOS field-effect transistor configuration.

The methods not shown in FIG. 9B are also compared below.

In this invention type, consider a case where the nMOS type field effect transistor is eliminated from the configuration of the second inverter (inverter 118) and only the resistor+pMOS type field effect transistor is configured. In this case, as compared with the original type of this invention, the total charging current in the cooperative charging mode, thus, the total current from the solar panel 101 and "the AC adapter 104 or the mobile battery 127 connected by the switch 125" will be decreased, so this type is not suitable.

Consider a case of this invention in which a pMOS field effect transistor is added to the configuration of the first inverter (inverter 117) and an nMOS field effect transistor+a resistor+a pMOS field effect transistor for b—oth inverters is configured. In this case, the current consumption is smaller in the fine weather mode than in the original type of this invention, but in the fine weather mode, the solar panel 101 is generating electricity, and the current consumption is medium enough, so the merit is not so great. This configuration does not cause any particular problem in operation, but the cost increases by one pMOS type field effect transistor.

The ingenuity of (1), (2), and (3) is not a simple addition effect, but a very large effect that the period during which power is supplied to the power node 314 can be made very close to 100%. Since the current consumption is reduced in the night mode in (3), the control circuit operates using the power charged in the large-capacity capacitor connected in (2) even during the period when the power supply cannot be obtained in (1).

However, with the above alone, when the USB device (charge target device) 106 is pulled out from the USB jack 105, and once the mobile battery is determined to be fully charged and disconnected, and the USB device (charge target device) 106 is again connected to the USB jack, it is the fact that even if it is connected to 105, charging may not start again. As an element for passing a current, connecting by a resistor 126 between the power supply of the control circuit and the charging node 318 may solve the problem.

Figure 11:
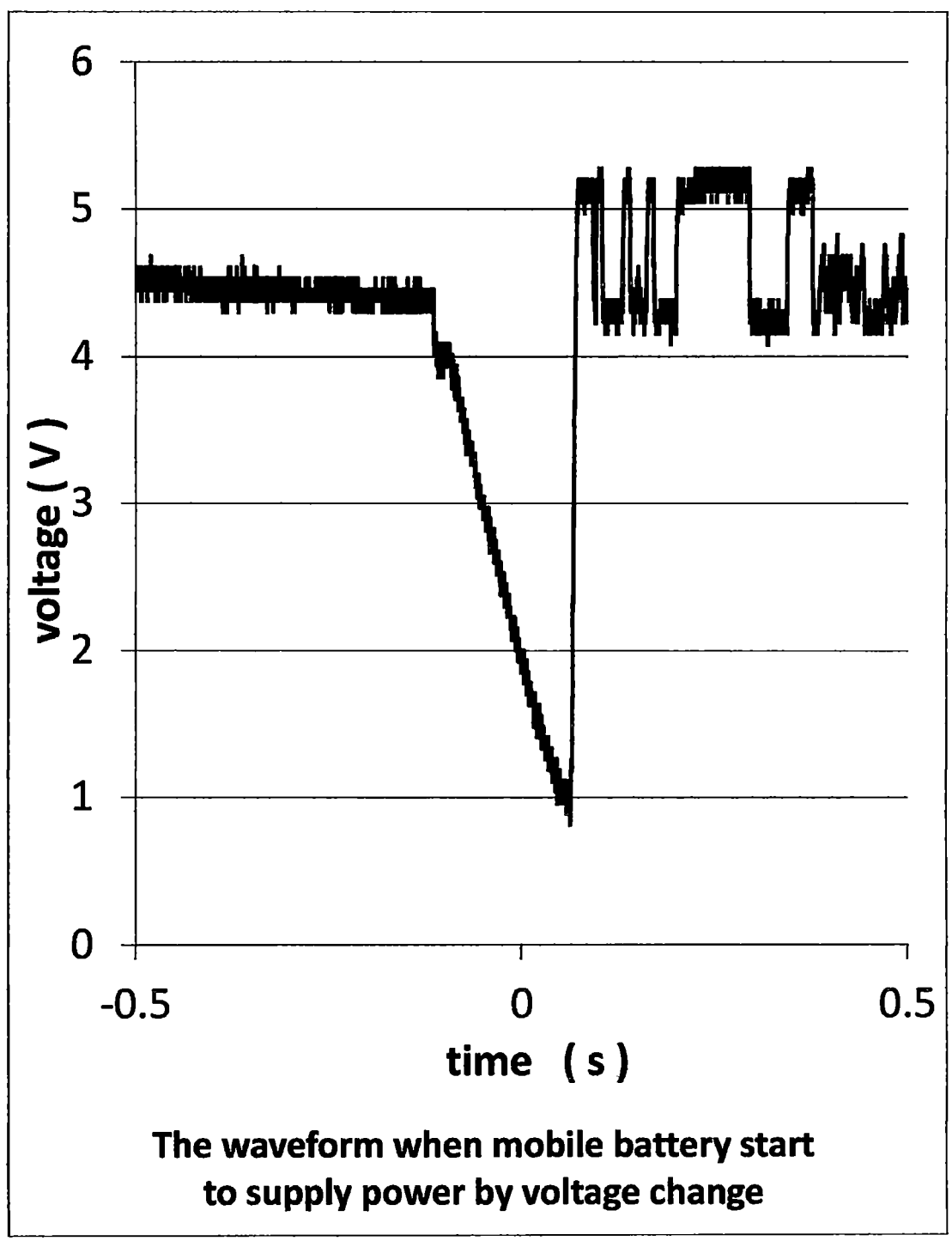
FIG. 11 shows a state in which the mobile battery starts to supply electric power due to a change in voltage.

The inventor think that some mobile batteries continue charging when the potential of the charging node 318 is high, and some mobile batteries judge that charging should be started again when the charging node 318 has a large potential change. If the potential of the charging node 318 is high to some extent with the USB device (charge target device) 106 removed from the USB jack 105, a large potential change occurs when the USB device (charge target device) 106 is connected to the USB jack 105. Even in the case of a mobile battery detects a large potential change, the connection may not be detected if the capacitor 114 has too large a capacity. FIG. 11 shows how the mobile battery starts to supply electric power due to a change in voltage. The horizontal axis is the time and the vertical axis is the potential of the node 318. This is the waveform data acquired by an oscilloscope.

In the case where the USB device (charge target device) 106 is unplugged from the USB jack 105 and left for a while with three types of commercially available mobile batteries, the inventor reconnects the USB device (charge target device) 106. An experiment was conducted to see if discharging was started from the mobile battery 127. In addition to the ingenuity of the USB jacks 105 (1), (2), and (3), by introducing a resistor 126 as an element for passing current, the resistor 126 is 1 MΩ (megaohm), and the electrolytic capacitor 470uF (microfarad)+ceramic capacitor 0.1uF (microfarad) are added to the capacitor 114. charging was immediately resumed with two of the three types of mobile batteries. In the remaining one type of mobile battery, if the resistor 126 is 10 kΩ (kiloohm) and the capacitor 114 are an electrolytic capacitor 10 uF (microfarad)+a ceramic capacitor 0.1 uF (microfarad), charging may be resumed immediately.

What is important is that when the resistor 126 is connected between the power supply node 314 and the charging node 318 of the control circuit as an element for passing current and the USB device (charge target device) 106 is pulled out from the USB jack 105 again and even if the USB device (device to be charged) 106 is connected to the USB jack 105, charging may be started again. Since the resistance value of the resistor 126 and the capacitance value of the capacitor 114 are parameters that should be optimized according to the mobile battery and are design matters, the resistance value of the resistor 126 and the capacitance value of the capacitor 114 have nothing to do with the scope of claims of this invention. As an element for passing a current, an element other than a resistor, for example, a light emitting diode or a Zener diode may be substituted.

As a result, when the USB device 106 change state from being not connected to the USB jack 105 to being connected to the USB jack 105, in most cases, the solar panel 101 or the AC adapter 104 or the mobile battery 127 immediately start to supply power to the USB device 106. In particular, the power supplied from the mobile battery 127 is the effect of (1), (2), (3) and the element (resistor) 126 that allows current to flow.

By using the co-charging system of this invention, a 12V battery such as a lead storage battery is not required, so that depreciation cost can be suppressed. In addition, the weight is reduced because there is no heavy lead-acid battery. Regarding the path of direct charging from the solar cell, it is a DC power supply that charges the charging target without converting it to alternating current from the solar panel even once, and voltage conversion is performed only once, so there is no waste. And since it is equipped with a stand-alone mode and has an analog switching element in the solar cell system to provide feedback, it is possible to efficiently charge the device to be charged even when power is supplied only from the solar cell. Then, when the solar cell is not generating power, there is an analog switching element connected in series between the solar cell and the device to be charged with the directions reversed from each other, therefore, when there is only one solar cell, it is normally independent., it does not require reverse current protection diode which is usually necessary for common independent power system. Therefore, when there is only one solar cell, there is no voltage drop due to the reverse current prevention diode, and the power efficiency is good. Further, due to various measures such as a diode, a large-capacity capacitor, and power saving, even if the mobile battery stops supplying power once, charging is started immediately depending on the mobile battery when the device to be charged is connected.

Although the description of the first embodiment and the name and contents of the drawings are not used as examples, the description of the embodiments and the names and contents of the drawings are examples, and the claims of this invention can be modified within the range of the claims.

INDUSTRIAL APPLICABILITY

Suitable for home charging system.

EXPLANATION OF SYMBOLS 101 solar cell
102 Commercial AC power supply
103 DC-DC converter
127 mobile battery
104 AC adapter
105 USB jack
106, USB device (device to be charged)
107, 108 Jack
110 Analog switching element (bidirectional limitation) (first switching element)
111 Analog switching element (unidirectional limitation) (second switching element)
112, 113, 114 Capacitors (capacitors)
115, 116 resistors
117, 118 Inverter
119, 120, 123 Rectifying diode
121, 122 ammeter
124 Large-capacity capacitor (capacitor)
125 mechanical switch (third switch)
126 Resistor (element that allows current to flow)
311, 312, 313, 34-47 315, 324 nodes
314 third node
316 output node of the first DC/DC converter
317 first node
318 first charging node
319 second node
320 fourth node
322 input node
501 control circuit
201, 202, 203 pMOS field effect transistor
401, 402, 403, 404, 405, 406 nodes
211, 213 nMOS field effect transistor
212, 214 resistors
215 pMOS field effect transistor
411, 412, 413, 414, 415, 416, 417, 418 nodes
221 Integrated circuit parts with DC-DC converter function
222,223 Capacitor (capacitor)
224 resistor
421, 422, 423 nodes
231 USB jack
232 resistor
431, 432 nodes
611 switching element
612 Inductor (coil)
613 Rectifying diode

The invention claimed is:
1. A circuit
comprising a first inverter circuit, a second inverter circuit, a first rectifying diode, a second rectifying diode, a third rectifying diode, a first capacitor, a first current- carrying element, a first node, a second node, a third node an output node of the first DC/DC converter node, and a first charging node, wherein the first inverter circuit includes an n-channel electric field effect transistor and a resistor, and the second inverter circuit includes an n-channel electric field effect transistor, a resistor, and a p-channel electric field effect transistor wherein the power supply node of the first inverter circuit is connected to the third node, and the power supply node of the second inverter circuit is connected to the third node and the anode of the first rectifying diode is connected to the output node of the first DC/DC converter node, the cathode of the first rectifying diode is connected to the third node, and the anode of the second rectifying diode is connected to the first node, and the cathode of the second rectifying diode is connected to the third node, the anode of the third rectifying diode is connected to the second node, the cathode of the third rectifying diode is connected to the third node, and one end of the first capacitor is connected to the third node, and the first elements that carry a current are connected between the third node and the first charging node, and the capacitance of the first capacitor is 0.1 F (farad) or more.

2. A charging system comprising a first voltage determination circuit, 1st DC/DC converter, first analog switch, a second analog switch, a third switch, a first charging node, a third node, a output node of the first DC/DC converter node, and a first charging node wherein the first voltage determination circuit determines the voltage of the input node of the first DC/DC converter, and the first analog switch is connected to the node between the output node of the first DC/DC converter and the first charging node, the second analog switch is connected between the fourth node and the first charging node, and the first voltage determination circuit makes the first analog switch turned on, and makes the second analog switch turned off if it judges that the voltage of the input node is larger than the first constant voltage value, and the first voltage determination circuit makes the first analog switch turned off, and makes the third second analog switch turned on if it judges that the voltage of the input node is smaller than the first constant voltage value, and a current is not supplied to the first charging node by the supply current from the input node of the first DC/DC converter, instead, a current is supplied to the first charging node by the supply current from the fourth node, if the input node of the first DC/DC converter is smaller than the first constant voltage value, and a current is supplied to the first charging node by the supply current from the fourth node and the supply current from the input node of the first DC/DC converter if the input node of the first DC/DC converter is equal to the first constant voltage value and the power from the power supply source connected to the fourth node can be obtained, and a current is supplied to the first charging node by the supply current from the input node of the first DC/DC converter, instead, a current is not supplied to the first charging node by the supply current from the third fourth, if the input node of the first DC/DC converter is larger than the first constant voltage value, and the third switch selectively connects to the fourth node and either the first node or the second node, wherein the first voltage determination circuit has a first inverter circuit, a second inverter circuit, a first rectifying diode, a second rectifying diode, a third rectifying diode, an first capacitor, a first current-carrying element wherein the first inverter circuit includes an n-channel electric field effect transistor and a resistor, and the second inverter circuit includes an n-channel electric field effect transistor, a resistor, and a p-channel electric field effect transistor wherein the power supply node of the first inverter circuit is connected to the third node, and the power supply node of the second inverter circuit is connected to the third node and the anode of the first rectifying diode is connected to the output node of the first DC/DC converter node, the cathode of the first rectifying diode is connected to the third node, and the anode of the second rectifying diode is connected to the first node, and the cathode of the second rectifying diode is connected to the third node, the anode of the third rectifying diode is connected to the second node, the cathode of the third rectifying diode is connected to the third node, and one end of the first capacitor is connected to the third node, and the first elements that carry a current are connected between the third node and the first charging node, and the capacitance of the first capacitor is 0.1 F (farad) or more.

3. A charging system according to claim 2, wherein the first analog switch is field effect transistors in which sources are connected in opposite directions are connected in series.

4. A charging system according to claim 3, comprising a second capacitor, a third capacitor, and a fourth capacitor, wherein the second capacitor is connected to an input node of the first DC-DC converter, and the third capacitor is connected to the output node of one DC-DC converter, the fourth capacitor is connected to the first charging node.

5. A charging system according to claim 4, wherein the input node of the first DC-DC converter is connected to a solar panel, and an AC adapter can be connected to the first node, and a mobile battery can be connected to the second node, wherein the first charging target device is charged by the current from both a solar panel and "the AC adaptor or the mobile battery, which is selected by the third switch" if the first charging target device is connected and need charging, and ("if the AC adaptor is selected by the third switch and connected to AC power" or "if the mobile battery is selected by the third switch and connected electrically"), wherein the first charging target device is charged by the current from the solar panel if the first charging target device is connected and need charging, and ("if the AC adaptor is selected by the third switch and not connected to AC power" or "if the mobile battery is selected by the third switch and not connected or supply electric power").

* * * * *